United States Patent [19]

Machida

[11] Patent Number: 5,426,599
[45] Date of Patent: Jun. 20, 1995

[54] HARDWARE IMPLEMENTED MULTIPLIER FOR PERFORMING MULTIPLICATION OF TWO DIGITAL DATA ACCORDING TO BOOTH ALGORITHM

[75] Inventor: Hirohisa Machida, Hyogo, Japan

[73] Assignee: Mitsubishi Denki Kabushiki Kaisha, Tokyo, Japan

[21] Appl. No.: 63,488

[22] Filed: May 19, 1993

[30] Foreign Application Priority Data

Jun. 17, 1992 [JP] Japan .................................. 4-158255

[51] Int. Cl.⁶ .............................................. G06F 7/52
[52] U.S. Cl. ...................................................... 364/760
[58] Field of Search ........................ 364/754, 757, 760

[56] References Cited

U.S. PATENT DOCUMENTS

| | | | |
|---|---|---|---|
| 4,965,762 | 10/1990 | Williams | 364/760 |
| 5,070,471 | 12/1991 | Dao-Trong et al. | 364/760 |
| 5,150,322 | 9/1992 | Smith et al. | 364/760 |

OTHER PUBLICATIONS

"A Signed Binary Multiplication Technique" by A. D. Booth, 1951, Oxford Univ. Press.

*Primary Examiner*—Tan V. Mai
*Attorney, Agent, or Firm*—Lowe, Price, LeBlanc & Becker

[57] ABSTRACT

The multiplier includes a register circuit for holding a multiplicand X, a multiplier register circuit for holding a multiplier Y, a second order Booth decoder circuit for decoding prescribed less significant bits of the multiplier Y according to the second Booth algorithm, and a third order Booth decode circuit for decoding more significant bits of the multiplier Y according to the third Booth algorithm. A tripled of the multiplicand X is produced in a 3X producing circuit in parallel with a multiplication operation utilizing the second Booth algorithm in an adder array. The output of adder array together with the output of 3X producing circuit is applied to an adder array for executing a multiplication operation according to the third order Booth algorithm. Production of an odd number multiple data of the multiplicand necessary for the third order Booth algorithm is executed in parallel with the multiplication operation according to the second order Booth algorithm, and therefore time required for producing the triple can apparently be eliminated. Thus, a multiplier capable of executing multiplication at a high speed in a hardware manner is provided.

18 Claims, 26 Drawing Sheets

FIG. 8.
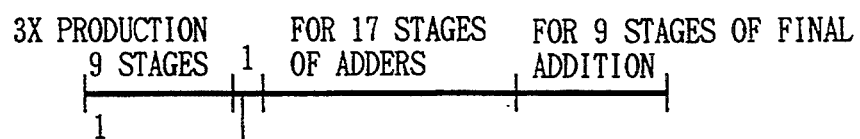
(a) TOTAL 36 STAGES
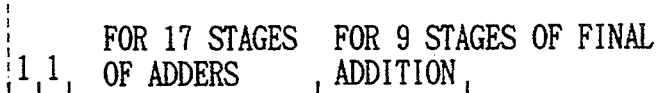
(b) TOTAL 28 STAGES

FIG. 21 PRIOR ART

```
            1  0  1  0
         x) 0  1  0  1
         ─────────────
            1  0  1  0
         0  0  0  0
      1  0  1  0           ← PARTIAL PRODUCT
   0  0  0  0
   ──────────────────────
   0  0  1  1  0  0  1  0
```

| A | B | S | CO |
|---|---|---|----|
| 0 | 0 | 0 | 0 |
| 0 | 1 | 1 | 0 |
| 1 | 0 | 1 | 0 |
| 1 | 1 | 0 | 1 |

| A | B | CI | S | CO |
|---|---|----|---|----|
| 0 | 0 | 0  | 0 | 0  |
| 0 | 0 | 1  | 1 | 0  |
| 0 | 1 | 0  | 1 | 0  |
| 0 | 1 | 1  | 0 | 1  |
| 1 | 0 | 0  | 1 | 0  |
| 1 | 0 | 1  | 0 | 1  |
| 1 | 1 | 0  | 0 | 1  |
| 1 | 1 | 1  | 1 | 1  |

HARDWARE IMPLEMENTED MULTIPLIER FOR PERFORMING MULTIPLICATION OF TWO DIGITAL DATA ACCORDING TO BOOTH ALGORITHM

BACKGROUND OF THE INVENTION

1. Field of the Invention

The present invention relates to hardware implemented multipliers for performing multiplication of two numbers in binary representation.

2. Description of the Background Art

In the field of image processing which deals with a large amount of image data or in the field of information processing which utilizes computers or CPUs (Central Processing Units), multiplication of data is one important processing. For example, DCT (Discrete Cosine Transformation), digital filter processing, matrix operation and the like are processings requiring multiplication.

In such fields of art, data is usually represented in binary number. Therefore in multiplication, data in binary representation will be multiplied.

FIG. 21 is a representation showing one example of multiplication of 4 bit binary numbers. In FIG. 21, a binary number "1010" is multiplied by a binary number "0101". The multiplication is simply performed in the same manner as a multiplication of decimal numbers. In binary representation, different from decimal numbers, each digits has a weight of 2, such as $2^0, 2^1, 2^2 \ldots$. In FIG. 21, the intermediate sum surrounded by the dotted line is called partial product. The result of multiplication is given by adding up the partial products for each digit.

FIG. 22 is a diagram showing the structure of a conventional parallel multiplier for multiplying 4 bit binary numbers. In FIG. 22, the multiplier includes a register circuit 1a for holding a multiplicand X, and a register circuit 1b for holding a multiplier Y. The multiplicand X and the multiplier Y each are 4 bit data and include bits x4, x3, x2, x1 and bits y4, y3, y2, y1, respectively. The bit x4 and bit y4 are the most significant bits of the data X and Y, respectively, while the bit x1 and bit y1 are the least significant bits of the data X and Y, respectively. The data bits held at register circuit 1a are transferred on a multiplicand data line 2a, while data bits held at register circuit 1b are transferred on a multiplier data line 2b. The multiplicand data line 2a includes a data line 2a4 for transferring the data bit x4, a data line 2a3 for the data bit x3, a data line 2a2 for the data bit x2, and a data line 2a1 for the data bit x1.

The multiplier data line 2b includes a data line 2b1 for transferring the data bit y1, a data line 262 for the data bit y2, a data line 263 for the data bit y3, and a data line 264 for the data bit y4.

The multiplier further includes AND circuits AN11-AN44 arranged correspondingly to the cross over points of the multiplicand data line 2a and the multiplier data line 2b. In FIG. 22, AND circuits arranged in the horizontal direction produce one partial product. More specifically, AND circuits AN11-AN14 produce the product of the data bit y1 and the multiplicand X. AND circuits AN21-AN24 give the product of the data bit y2 and the multiplicand data X. AND circuits AN31-AN34 give the product of the data bit y3 and the multiplicand X, and AND circuits AN41-AN44 give the product of the data bit y4 and the multiplicand X.

In order to produce the final product X·Y by adding up the partial products produced by AND circuits AN11-AN44, adding circuits AD11-AD43 are provided. Adding circuits AD11, AD12, and AD13 are half adders which receive respective outputs of AND circuits AN21-AN23 at their one inputs A, add up data bits applied to their inputs A and B to output sum data bits from outputs S and carry signals from their carry out outputs CO to adding circuits in the second stage. Adding circuits for receiving the outputs of AND circuits AN31-AN44 at their inputs A are full adders. Each full adder adds data bits applied to its inputs A and B and an input applied to its carry input CI and outputs a sum data bit from its output S and a carry out signal from its carry out CO.

Adding circuits AD11-AD13 in the first stage receive the outputs of corresponding AND circuits AN21-AN23 at their one inputs A, and the outputs of AND circuits AN12-AN14 which produce the partial product in the preceding stage at their the other inputs B. The carry outputs of adding circuits AD11-AD13 are respectively provided to the carry inputs CI of adding circuits AD21-AD23 at 1 bit higher digit in the next stage. Adding circuits AD21 and AD22 receive the outputs of corresponding AND circuits AN31 and AN32 at their one inputs A, and the outputs of corresponding adding circuits AD21 and AD23 at their the other inputs B. Adding circuit AD23 receives the output of AND circuit AN33 at its one input A and the output of AND circuit AN24 at the other input B. The carry outputs of adding circuits AD21-AD23 are provided to the carry inputs CI of adding circuits AD31-AD33 at 1 bit higher digit in the next stage.

Adding circuits AD31-AD33 receive the outputs of AND circuits AN41-AN43 at their one inputs A. Adding circuits AD31 and AD32 receive the addition outputs (S) of corresponding adding circuits AD22 and AD23 at their the other inputs B. Adding circuit AD33 receives the output of AND circuit AN34 at its the other input B.

Adding circuit AD41 which produces a final output is a half adder and receives the carry output of adding circuit AD31 at the other input B and the sum output S of adding circuit AD32 at its one input A. The carry output of adding circuit AD41 is applied to the carry input CI of an adjacent adding circuit AD42. Adding circuit AD42 receives the sum output S of adding circuit AD33 at its one input A and the carry output of adding circuit AD32 at the other input B. The carry output of adding circuit AD42 is provided to the carry input CI of an adjacent adding circuit AD43. Adding circuit AD43 receives the output of AND circuit AN44 and the carry output of adding circuit AD33.

In the structure illustrated in FIG. 22, a block surrounding by AND circuits AN11-AN44 and adding circuits AD12, AD13, AD22, AD23 and AD32, in other words a block 5 defined by the dotted line will be referred to as an adder array. A block formed of adders AD11, AD21, AD31, AD41, AD42 and AD43 which output final multiplication result, in other words a block 10 defined by the dotted line will be referred to as a final adder chain.

In the structure of the multiplier illustrated in FIG. 22, AND circuits produce partial products, addition of the partial products is performed in adding circuits, and the operation shown by way of example in FIG. 21 is performed in the multiplier.

More specifically, the multiplier first produces partial products utilizing the AND circuits, and then performs multiplication operation by adding up the partial products utilizing the adding circuits. In other words, a 8 bit product Z is produced from the 4 bit multiplier Y and the 4 bit multiplicand X.

FIG. 23A is a representation showing one example of the structure of the half adder shown in FIG. 22. In FIG. 23A, the half adder includes an AND circuit 48 for receiving data bits provided to its inputs A and B through signal lines 43 and 44, and an ExOR circuit 49 for producing an exclusive logical sum of the data bits on signal lines 43 and 44. A carry output CO is output from AND circuit 48, and a sum output S is produced from ExOR circuit 49. The half adder, as illustrated in FIG. 23B, produces a carry output CO of "1" on signal line 46 when the data bits provided to inputs A and B both are "1". ExOR circuit 49 serves as a non-coincidence detector and produces the output S of "1" on a signal line 47 when the logics of data bits provided to inputs A and B are not coincident.

FIG. 24A illustrates one example of the structure of the full adder shown in FIG. 22. In FIG. 24A, the full adder includes an inverter circuit IV1 for inverting an input data bit B provided through signal line 54, an inverter circuit IV2 for inverting an input data bit A on signal line 53, a transmission circuit Tr2 for passing the output of inverter circuit IV1 in response to the output of inverter circuit IV2, a transmission circuit Tr1 for passing the input data bit B on signal line 54 in response to the input data bit A on the signal line 53. Transmission circuits Tr1 and Tr2 each are provided in parallel and transmit a signal to a node ND when a signal applied to the gate is in an "H" level.

The full adder further includes a transmission circuit Tr3 for transmitting the input data bit A on the signal lines 53 in response to a potential on a node ND, an inverter circuit IV3 for inverting the signal potential of node ND, and a transmission circuit Tr4 for transmitting a carry input CI provided on a signal line 55. Transmission circuits Tr3 and Tr4 conduct in a complementary manner and produce a sum S on a signal line 57.

The full adder further includes a transmission circuit Tr5 for passing the signal (carry input) CI on signal line 55 in response to the output of inverter circuit IV3, an inverter circuit IV4 for inverting the carry input CI on signal line 55, a transmission circuit Tr6 for passing the output of inverter circuit IV4 in response to a signal potential on node ND, and an inverter circuit IV5 for inverting one of the outputs of transmission circuit Tr5 and transmission circuit Tr6, thereby producing a carry output CO on signal line 56. Transmission circuits Tr5 and Tr6 conduct in a complementary manner to each other. Transmission circuits Tr1-Tr6 each conduct when a signal of an "H" level (a signal of logical "1") is applied to the gate.

FIG. 24B sets forth in a table the inputs/outputs of the full adder shown in FIG. 24A. The full adder shown in FIG. 24A produces 2 bit outputs S and CO by adding up 3 bit inputs A, B, and CI. The carry output CO is a more significant bit. Assume that A, B and CI are all in the state of "1". In this condition, the bit B is transmitted to node ND through transmission circuit Tr1. Transmission circuit Tr6 conducts based on the bit B of "1" transmitted to node ND. Inverter circuit IV4 inverts the bit CI of "1" on signal lines 55. Accordingly, a signal of "1" is output on signal line 56 from inverter circuit IV5.

Meanwhile, transmission circuit Tr3 conducts based on the signal of "1" on node ND, and the bit A on signal line 53 is transferred onto signal line 57. Thus, the bits CO and S both attain the "1" level.

When the bits A, B, and CI are all in the "0" level, transmission circuit Tr2 conducts, and outputs a signal of "1" to node ND (the effect of inverter circuit IV1). Transmission circuit Tr3 conducts in response to the signal of "1" on node ND, and the bit A of "0" on signal line 53 is transmitted onto signal line 57. Thus, the bit S attains the "0" level.

Meanwhile, transmission circuit Tr6 conducts and passes the output of inverter circuit IV4. Inverter circuit IV4 has received the signal of "0" on signal lines 55. Accordingly, the output of transmission circuit Tr6 becomes the signal of "1", and the bit CO on signal line 56 attains the "0" state by the function of inverter circuit IV5.

When the signal on node ND is in the "1" state, transmission circuits Tr6 and Tr3 conduct, and otherwise, transmission circuits Tr4 and Tr5 conduct. The logical operation (adding processing) set forth in the table shown in FIG. 24B is implemented by the structure shown in FIG. 24A.

As illustrated in FIG. 22, multiplication of binary data is implemented by repeating the addition. The number of partial products is equal to the bit number of multiplier Y. The multiplier shown in FIG. 22 is a 4 bit multiplier. Generally in the field of computers today, data of at least 54 bits is utilized. Accordingly, multiplication of data of at least 54 bits will be necessary. In this case, adder array 5 shown in FIG. 22 will be extremely large in scale. If the adder array is large in scale, since a signal is sequentially transmitted across adding circuits included therein, extremely large signal delay results in the adder array. The signal delay increases with the number of stages of the adding circuits. The number of stages of the adding circuits is in proportion to the number of partial products in multiplication.

Therefore, the Booth algorithm is often utilized for efficiently performing multiplication by reducing the number of partial products. The Booth algorithm is a process of multiplying negative numbers represented in 2's (two's) complement notation without correction.

In the Booth algorithm, the data bits of the multiplier Y is divided into groups. FIG. 25 illustrates one example of dividing the multiplier Y into groups. FIG. 25 illustrates group division of the second order Booth algorithm. Each group includes three bits. One bit is shared between adjacent groups (the bit illustrated in shading in FIG. 25). One group produces one partial product. The number of partial products is about ½ in the case of the second order Booth algorithm. Generally, when one group includes m bits, it is referred to as the (m-1)-th Booth algorithm, and the number of partial products to be produced is about 1/(m-1). The Booth algorithm will be described in conjunction with the following expressions.

The multiplier Y is given by the following equation (1) when represented in 2's complement.

$$Y = -y_n \cdot 2^{n-1} + \sum_{i=1}^{n-1} y_i \cdot 2^{i-1} \tag{1}$$

where yn is a sign bit which indicates whether the multiplier Y is positive or negative. A data bit yi is a binary number "1" or "0". $2^j$ attached to each bit is the binary weight of each data bit.

In equation (1), if n is an even number and y0=0, the multiplier y will be developed as in the following equation (2):

$$Y = -y_n \cdot 2^{n-1} + y_{n-1} \cdot 2^{n-2} + \ldots + y2 \cdot 2^1 + y1 \cdot 2^0 \quad (2)$$
$$= (y_{n-2} + y_{n-1} - 2 \cdot y_n) \cdot 2^{n-2} +$$
$$(y_{n-4} + y_{n-3} - 2 \cdot y_{n-2}) \cdot 2^{n-4} +$$
$$\vdots$$
$$(y0 + y1 - 2 \cdot y2) \cdot 2^0$$

$$= \sum_{i=0}^{\frac{n}{2}-1} (y_{2i} + y_{2i+1} - 2 \cdot y_{2i+2}) \cdot 2^{2i}$$

where y0=0, n is an even number The product X·Y of the multiplier Y and the multiplicand X is given by the sum of partial products. Therefore, if three bits y2i, y2i+1, and y2i+2 are known, an operation necessary for producing the partial product is decided. The relation between the three bits y2i, y2i+1, and y2i+2 and the operation executed based on their values is set forth in Table 1.

TABLE 1

| Second Order Booth Algorithm | | | |
|---|---|---|---|
| $y_{2i+2}$ | $y_{2i+1}$ | $y_{2i}$ | Operation |
| 0 | 0 | 0 | 0 |
| 0 | 0 | 1 | X |
| 0 | 1 | 0 | X |
| 0 | 1 | 1 | 2X |
| 1 | 0 | 0 | −2X |
| 1 | 0 | 1 | −X |
| 1 | 1 | 0 | −X |
| 1 | 1 | 1 | 0 |

The operations executed in the second order Booth algorithm are 0, ±X, and ±2X.

The number twice as large as the multiplicand X, in other words 2X can readily be produced by a shift circuit for shifting the multiplicand X in the direction of more significant bits by 1 bit. "−" operation can be implemented by bit inversion and addition of "1". Therefore, if the operation to be executed is decided by the values of the three bits, the multiplication operation can be performed at a high speed. The Booth algorithm is not limited to the second order but there exist higher orders such as third order, fourth order, . . . Booth algorithms. The decomposition of the multiplier Y in the third order Booth algorithm and the operation to be executed at that case are given in equation (3) and Table 2.

$$Y = \sum_{i=0}^{\frac{n}{3}-1} (y_{3i} + y_{3i+1} + 2 \cdot y_{3i+2} - 4 \cdot y_{3i+3}) \cdot 2^{3i} \quad (3)$$

TABLE 2

| Third Order Booth Algorithm | | | | |
|---|---|---|---|---|
| $y_{3i+3}$ | $y_{3i+2}$ | $y_{3i+1}$ | $y_{3i}$ | Operation |
| 0 | 0 | 0 | 0 | 0 |
| 0 | 0 | 0 | 1 | X |
| 0 | 0 | 1 | 0 | X |
| 0 | 0 | 1 | 1 | 2X |
| 0 | 1 | 0 | 0 | 2X |
| 0 | 1 | 0 | 1 | 3X |
| 0 | 1 | 1 | 0 | 3X |
| 0 | 1 | 1 | 1 | 4X |

TABLE 2-continued

| Third Order Booth Algorithm | | | | |
|---|---|---|---|---|
| $y_{3i+3}$ | $y_{3i+2}$ | $y_{3i+1}$ | $y_{3i}$ | Operation |
| 1 | 0 | 0 | 0 | −4X |
| 1 | 0 | 0 | 1 | −3X |
| 1 | 0 | 1 | 0 | −3X |
| 1 | 0 | 1 | 1 | −2X |
| 1 | 1 | 0 | 0 | −2X |
| 1 | 1 | 0 | 1 | −X |
| 1 | 1 | 1 | 0 | −X |
| 1 | 1 | 1 | 0 | 0 |

FIG. 26 shows the structure of a multiplier utilizing a Booth algorithm. In FIG. 26, the multiplier includes a register circuit 1a for holding multiplicand data X, and a register circuit 1b for holding multiplier data Y. A decode circuit 3 for decoding the multiplier data Y provided from register circuit 1b through a multiplier data line 2b according to the Booth algorithm, and outputting a signal representing the result of decoding, an adder array 5 for producing partial products based on the multiplicand data X applied from register circuit 1a on a multiplicand data line 2a and a control signal applied on a decoding result output line 8 according to the Booth algorithm and for producing an intermediate sum by adding up the partial products, and a final adder chain 10 for receiving the output data from adder array 5 through an output line 9 and performing a final addition. Data representing the result of multiplication X·Y which is produced by multiplying the multiplicand data X by the multiplier data Y is transmitted onto a signal line 11 from final adder chain 10.

Adder array 5 includes a selector circuit for producing a partial product by performing a selection operation in response to the control signal applied from decode circuit 3 onto decoding result output lines 8.

When performing a decoding operation according to the second order Booth algorithm, decode circuit 3 produces the control signal enabling the operation given in Table (1) to be executed. 0, X, and 2X are produced from the selector circuit in response to the control signal. −X and −2X are produced only by sign inversion (bit inversion and addition of "1"). The internal structure of adder array 5 includes a selector for performing a selection operation based on a decoding result output from decode circuit 3 in place of the AND circuit in the structure of the multiplier shown in FIG. 22. The arrangement of adders are shifted toward the direction of more significant bits by 2 bits for each stage (in the case of the second order Booth algorithm).

The number of decoding result output lines 8 from decode circuit 3 is decided by the bit number of multiplier data Y and the order of Booth algorithm to be executed.

FIG. 27 is a diagram showing a circuit for performing multiplication of 4 bit multiplier data Y and 4 bit multiplicand data X. The multiplier data Y includes a bit y0 (=0) in addition to bits y1–y4. The multiplicand data X includes bits x1–x4. Decoder circuit 3 includes a decoder 3a1 for decoding the bits y0, y1, and y2 and transmitting the result of the decoding to an output line and transmitting the result of decoding onto a signal line 8b.

Adder array 5 includes a shift circuit 102 for shifting the multiplicand data X (bits x1–x4) held at register circuit la toward more significant bits by 1 bit and producing 2X, a selector circuit 104 for receiving the outputs of register circuit la and shift circuit 102, and selecting a corresponding operation in response to the decode result signal on output line 8a, thereby producing a first partial product, a selector circuit 106 for receiving the multiplicand data X from register circuit 1a and the shift data from shift circuit 102, and selecting a corresponding operation based on the result of decoding on an output line 8b, thereby producing a second partial product, and adding circuits AD102 and AD104 for producing an intermediate sum by adding up the partial products produced by selector circuits 104 and 106.

Final adder chain 10 which outputs a final multiplication result based on the output of adder array 5 includes an adding circuit AD106 for receiving the carry output of adding circuit AD100 and the sum of adding circuit 102, an adding circuit 108 for receiving the carry output of adding circuit AD102, the sum of adding circuit AD104, and the carry output of adding circuit 106, an adding circuit AD110 for receiving the output of selector circuit 106, the carry output of adding circuit AD104, and the carry output of adding circuit 108, and an adding circuit AD112 for receiving the most significant bit output of selector circuit 106, and the carry output of adding circuit AD110. Adding circuits AD100, AD102, AD104, AD106, and AD112 are half adders, while adding circuits AD108 and AD110 are full adders.

The multiplier shown in FIG. 27 performs multiplication in accordance with the second order Booth algorithm. An 8 bit multiplication result is produced from the 4 bit multiplication data Y and the 4 bit multiplicand data X. Selector circuits 104 and 106 each have a 5 bit capacity. This is because the operation of 2X is performed and the state shifted toward more significant bits by 1 bit is expressed. The least significant bit of shift circuit 102 is set to be 0. Shift circuit 102 shifts the multiplicand data X provided from register circuit 1a toward more significant bits by 1 bit.

As illustrated in FIG. 27, according to the second order Booth algorithm, the number of partial products to be produced is 2, adding circuits are provided substantially in 2 stages, and therefore the number of stages of adding circuits is greatly reduced as compared to the structure of the multiplier shown in FIG. 22. Adding circuit AD112 included in final adder chain 10 may be formed of a full adder, and adding circuit AD110 may receive a carry output at its carry input and have its one input grounded.

If multiplication is performed according to the second order Booth algorithm, the number of partial products produced is 2, which is equivalent to half the number of partial products produced by the usual multiplier shown in FIG. 22. Thus, a high speed multiplication can be performed.

FIG. 28 is a diagram showing a conceptual structure when multiplication is performed according to the third order Booth algorithm. In FIG. 28, a third order Booth algorithm decode circuit 3 performing a decoding operation according to the third order Booth algorithm includes decoders 30a, 30b, . . . , 30p for receiving a prescribed set of 4 bit data from the bits y0-yr of the multiplier Y, respectively. Each of decoders 30a-30p produces a signal selecting a corresponding operation by performing a decoding operation shown in Table 2 based on the value of provided 4 bit data.

The multiplier further includes a constant multiple circuit 200 for multiplying the multiplicand data X (bits x1-xn) by a prescribed constant, in other words for producing $\pm X$, $\pm 2X$, $\pm 3X$, and $\pm 4X$, and selector circuits 202a, 202b, . . . , 202p provided correspondingly to the decoders 30a-30p of decode circuit 3 for selectively outputting one of outputs from constant multiple circuit 200 in response to control signals from output lines 8a-8p. Selector circuits 202a, 202b, . . . and 202p produce the first partial product, second partial product, . . . , and p-th partial product, respectively.

The multiplier further includes an adder 204 for adding up the partial products from selector circuits 202a-202p. Adder 204 includes both of the adder array and the final adder chain shown in FIGS. 26 and 27.

When multiplication is performed according to the third order Booth algorithm shown in FIG. 28, the number of partial products to be produced is p and is 1/3 the bit number of the multiplicand data Y.

The circuit for producing $\pm 3X$ in constant multiple circuit 200 executes an addition of $2X + X$ by inputting the multiplicand data X. $\pm 2X$ and $\pm 4X$ are produced by shifting operation of the multiplicand data X. The double sign $\pm$ is uniquely decided depending upon whether or not the sign is inverted. The triple value 3X cannot be produced simply by such a shifting operation and a sign inversion, and therefore the triple value 3X is produced by a shifting operation and an adding operation utilizing the multiplicand data X, in other words by performing an operation of producing 2X and addition of $2X + X$. Then $\pm 3X$ is produced based on inversion/non-inversion of the sign.

As described above, the number of partial products to be produced is reduced utilizing the Booth algorithm in multiplication of binary numbers, which enables a high speed multiplication operation. For example, consider the case of multiplication of 54 bit data. The number of partial products is 54 in usual multiplication without using the Booth algorithm. When the second order Booth algorithm is utilized, the number of partial products produced is reduced to 27. For the third Booth algorithm, the number of partial products produced is 18. More specifically, when the n-th Booth algorithm is utilized, the number of partial products produced is reduced to 1/n as compared to usual multiplication, and therefore operation time necessary for multiplication can be reduced.

The Booth algorithm however suffers from a disadvantage. When the multiplier Y is decoded according to the second order Booth algorithm, the value 2X twice as large as the multiplicand X is necessary for producing a partial product. Also if the multiplier Y is decoded according to the third order Booth algorithm, the values twice, three times and four times as large as the multiplicand X will be necessary for producing the partial products. Furthermore, when the multiplier Y is decoded according to the fourth Booth algorithm, the values twice, three times, four times, five times, six times, seven times, and eight times as large as the multiplicand X will be necessary for required partial products.

In the case of binary numbers, a power multiple of 2 such as twice, four times, and eight times can readily be produced by shifting data. However, values three times and fives as large cannot be produced only by such a shifting operation. When 3X is produced, the operation of $(2X + X)$ should be executed. A long period of time is necessary for performing the adding operation. More specifically, as the digit number of the internal operation increases, carrying the digits takes time, and operations for producing values three times and five times as large as multiplicand such as 3X and 5X cannot be performed at a high speed. Accordingly, the multiplication cannot be performed at a high speed as well.

More specifically, when the third Booth algorithm is applied, although the number of partial products produced is reduced, a longer period of time will be necessary for producing a value three times as large as the multiplicand X prior to executing addition of the produced partial products, and eventually time required for the operation increases. In this case, if the bit number of the multiplicand X increases, delay in the circuit for producing 3X naturally increases.

When the second order Booth algorithm is applied, only a value twice as large as the multiplicand X, 2X is necessary. The value 2X twice as large as the multiplicand X can readily be produced by a shifting a operation. As opposed to the case of producing the value 3X three times as large as the multiplicand X, a long period of time is not required. Therefore, the second order Booth algorithm significantly reduces the number of partial products produced and is useful in performing multiplication operation.

In view of the foregoing, in the designs of conventional multipliers, a Booth algorithm larger than the second order is not utilized. This is because third or larger order Booth algorithm must use odd number multiples which cannot produce constant multiples of the multiplicand X by a shifting operation, time delay in the circuit as a result cancels the effect of reducing the number of produced partial products, and furthermore delay in the circuit for producing odd number multiples overwhelms the effect of reducing the number of partial products with the increase of the bits of the multiplier and the multiplicand.

However, when multiplication is performed according to the second order Booth algorithm, the number of partial products is reduced only to $\frac{1}{2}$ at best. If the number of data bits further increases in the near future in the field of information processing, a higher order Booth algorithm must be used in order to reduce the number of partial products produced, thereby performing a high speed multiplication operation.

It is an object of the present invention to provide a multiplier capable of executing a high speed multiplication operation utilizing a Booth algorithm of the third or higher order.

When the bit number of data to be multiplied increases, a large load is imposed on multiplicand data line 2a and the data line 8 of Booth decode circuit 3. This is because a number of selector circuits are associated with multiplier data line 2a as illustrated in FIG. 27, and the decode result output line must drive all the associated selector circuits.

For example, as illustrated in FIG. 27, selector circuits 104 and 106 include selector circuits for performing selection operations on a bit-by-bit basis. The load associated with signal lines 2a and 8 increases with the increase of the bit number of data to be multiplied. Accordingly, in the output line 8 of the Booth decode circuit, for example, it takes a long period of time for the result of decoding to reach the farthermost end of output line 8. This is because of propagation delay in the signal line.

If the bit number of data to be multiplied increases as such, signal propagation delay increases regardless of the use/non-use of a Booth algorithm, which makes it difficult to perform a high speed multiplication. This applies to the structure of the multiplier shown in FIG. 22 as well.

Furthermore, when a Booth algorithm is utilized, adding circuits included in the adder array and adding circuits included in the final adder chain can perform an adding operation only after the Booth decode circuit has decoded the data and an operation to be selected by the decoding operation has been decided. This is because until then the output of the selector circuit is not decided. If the decoding operation of the Booth decode circuit has completed, it takes time for the result of decoding to reach the farthermost end of output line 8. The time delay must be accounted for in order to perform an accurate multiplication. Accordingly, difficulty in performing a high speed operation is encountered.

As described above, a conventional multiplier, particularly a multiplier utilizing a Booth algorithm is encountered with the following disadvantages.

(1) In a Booth algorithm of third order or larger, a long period of time is necessary for producing data for odd number multiples of a multiplicand X such as a triple 3X which impedes a high speed operation characteristic.

(2) Since a large load is connected to the output line of a Booth decode circuit, signal propagation delay is present in the output line, and high speed multiplication is impeded.

(3) When a Booth algorithm is utilized, an adding circuit cannot execute an adding operation until the output of a Booth decode circuit is decided. This makes it difficult to perform a high speed multiplication.

SUMMARY OF THE INVENTION

It is an object of the present invention to provide a multiplier capable of executing a high speed multiplication.

Another object of the present invention is to provide a multiplier utilizing a Booth algorithm and capable of executing a high speed multiplication.

A further object of the invention is to provide a multiplier utilizing a Booth algorithm of third or larger order and still capable of executing a high speed multiplication.

A multiplier according to the invention includes the following three independent characteristics. More specifically, (1) The second order Booth algorithm and the third order Booth algorithm are mixed.

(2) A Booth decode circuit is provided on the side of the less significant bits of a multiplicand.

(3) An adding circuit is operated during the period of decoding by the Booth decode circuit, and an adding result is selected based on the result of the decoding.

These three characteristics may be combined. Multiplication of binary numbers can be performed efficiently and at a high speed by making use of most of the advantages brought about by the Booth algorithms.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a representation showing the advantageous effect of the multiplier shown in FIG. 7;

FIG. 21 is a representation showing one example of multiplication of 4 bit binary numbers;

DETAILED DESCRIPTION OF THE PREFERRED EMBODIMENTS

In the following description, a number decoded based on a Booth algorithm among two numbers to be multiplied is referred to as "multiplier", while the number not to be decoded is called "multiplicand".

EMBODIMENT 1

Figure 1:
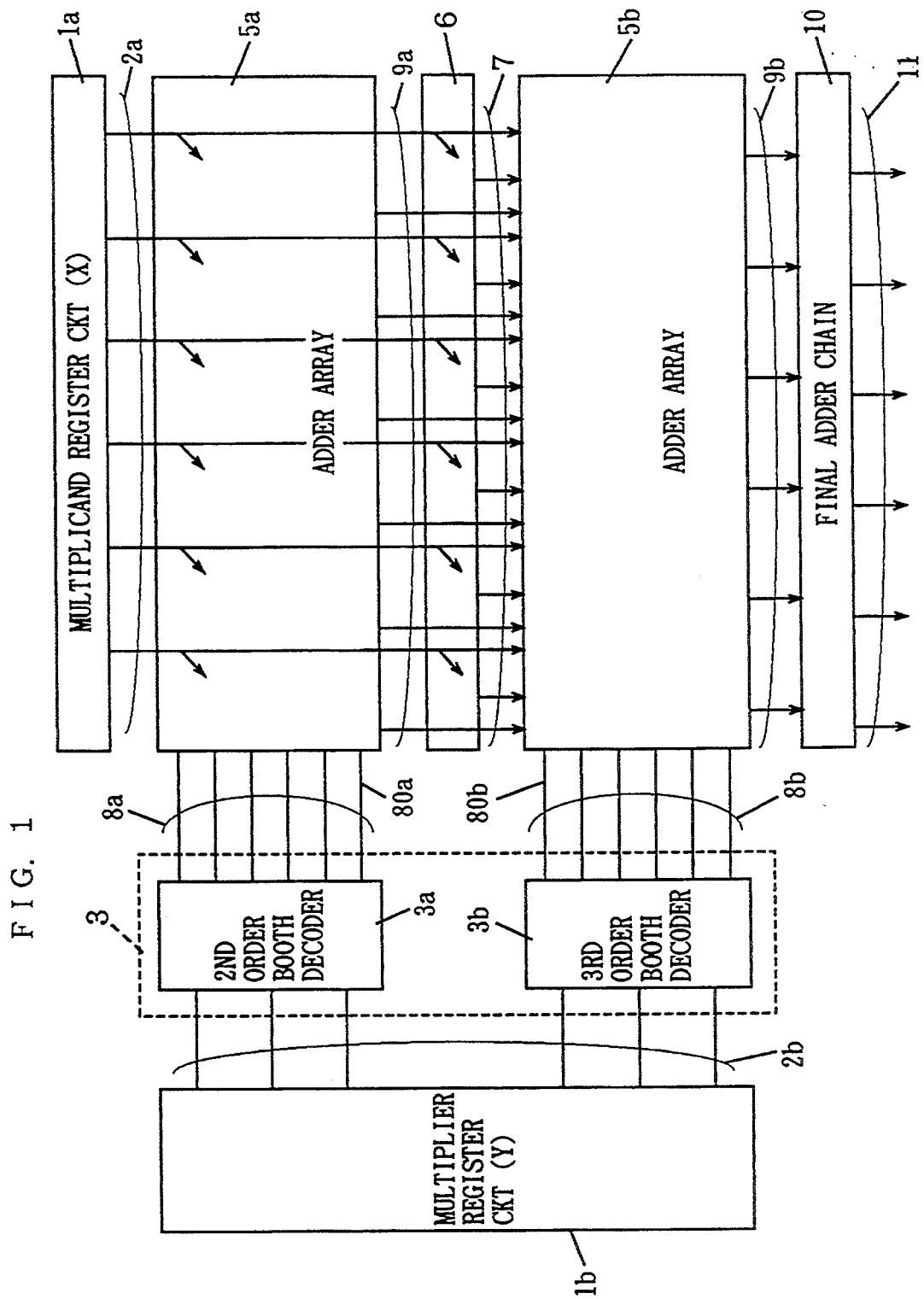
FIG. 1 is diagram showing the overall structure of a multiplier according to a first embodiment of the invention.

FIG. 1 is a block diagram schematically showing the overall structure of a multiplier according to a first embodiment of the invention.

In FIG. 1, the multiplier includes a multiplicand register circuit $1a$ for holding a multiplicand X, a multiplier register circuit $1b$ for holding a multiplier Y, and a Booth decode circuit 3 for decoding the multiplier Y according to 2nd order Booth algorithm. Booth decode circuit 3 includes a second order Booth decoder circuit $3a$ for receiving a prescribed number of less significant bits of the multiplier Y from multiplier register circuit $1b$ and performing a decoding operation based on the second order Booth algorithm, and a third order Booth decoder circuit $3b$ for receiving the remaining more significant bits of the multiplier Y from multiplier register circuit $1b$ based on the third order Booth algorithm. The result of the decoding from the second order Booth decoder circuit $3a$ is provided to an adder array $5a$ through an output line $8a$. The result of the decoding from third order Booth decoder circuit $3b$ is provided to an adder array $5b$ through an output line $8b$.

Adder array $5a$ produces a partial product and an intermediate sum based on the second order Booth algorithm according to the multiplicand X from multiplicand register circuit $1a$ and the decoding result signal from the second order Booth decoder circuit $3a$. Adder array $5a$ incudes selector circuits according to the second order Booth algorithm (operation selection in Table 1), and an array of adders for producing an intermediate sum by adding up partial products produced by the selector circuits.

Adder array $5b$ receives the decode result signal from third Booth decoder circuit $3b$, the multiplicand X from multiplicand register circuit $1a$, the intermediate sum from adder array $5a$, and triple data (3X) from triple producing circuit 6, and produces partial products based on the third Booth algorithm and an intermediate sum as well. The output of adder array $5b$ is provided to a final adder chain 10 through an output line $9b$.

Triple producing circuit 6 the structure of which will be described later, receives the multiplicand X from multiplicand register circuit $1a$, and performs an operation of (2X+X), thereby producing the triple data of the multiplicand X. Triple producing circuit 6 is shown in FIG. 1 as being disposed between adder array $5a$ and adder array $5b$. Binary data representing the results of multiplication X·Y of the multiplicand X and multiplier Y is output on a signal line 11. The specific structure of each circuit will be described.

Figure 2:
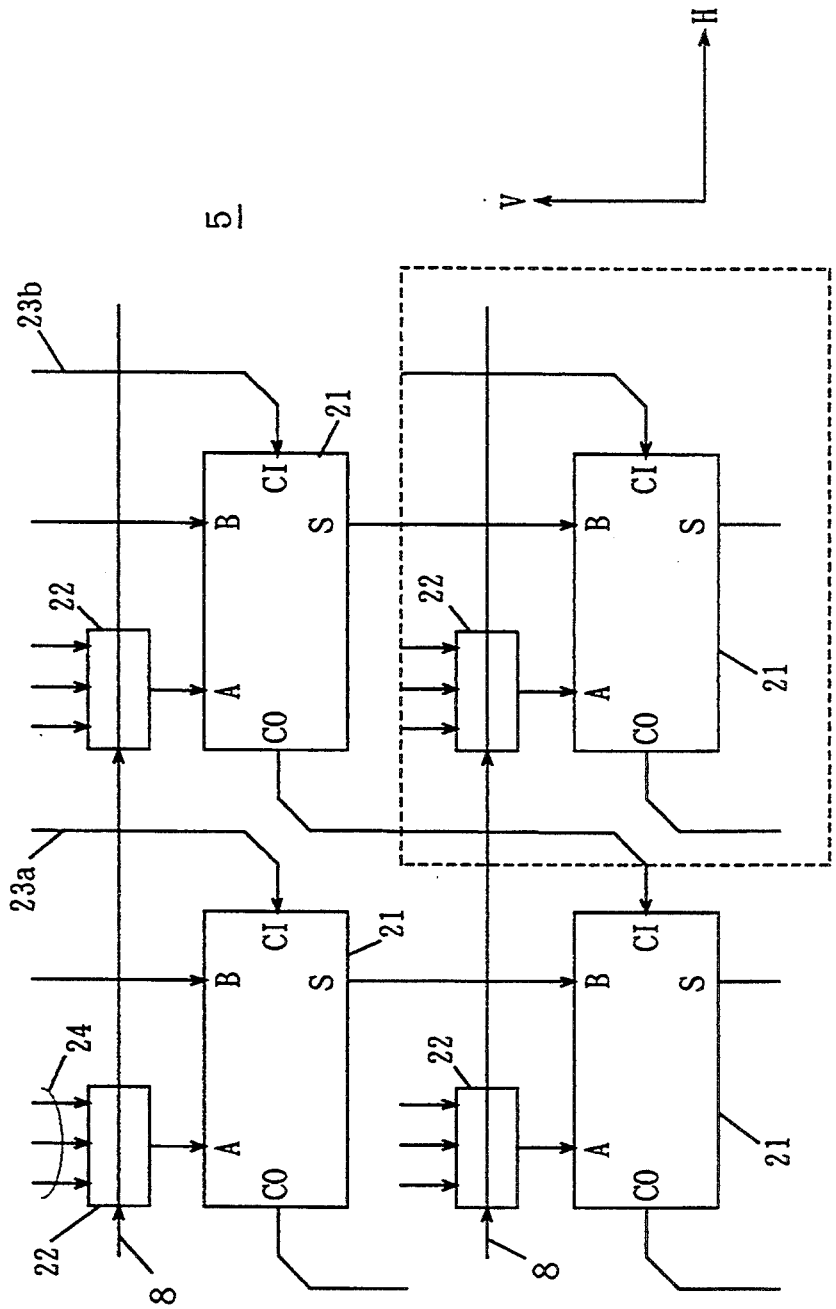
FIG. 2 is a diagram specifically showing the internal structure of an adder array shown in FIG. 1.

FIG. 2 is a diagram showing the specific structure of adder arrays $5a$ and $5b$.

In FIG. 2, since adder arrays $5a$ and $5b$ have identical structures, the structure is shown as adder array 5. In FIG. 2, adder array 5 includes full adders 21 arranged in an array. Each full adder 21 receives at its one input multiplicand data X or a sum output S from a preceding full adder and at its input A the output of selector circuit 22. A carry input CI is provided with the carry output of a 1 bit less significant adder at a preceding stage, and its carry output CO is provided to the carry input CI of an adjacent bit adder at a subsequent stage.

Figure 22:
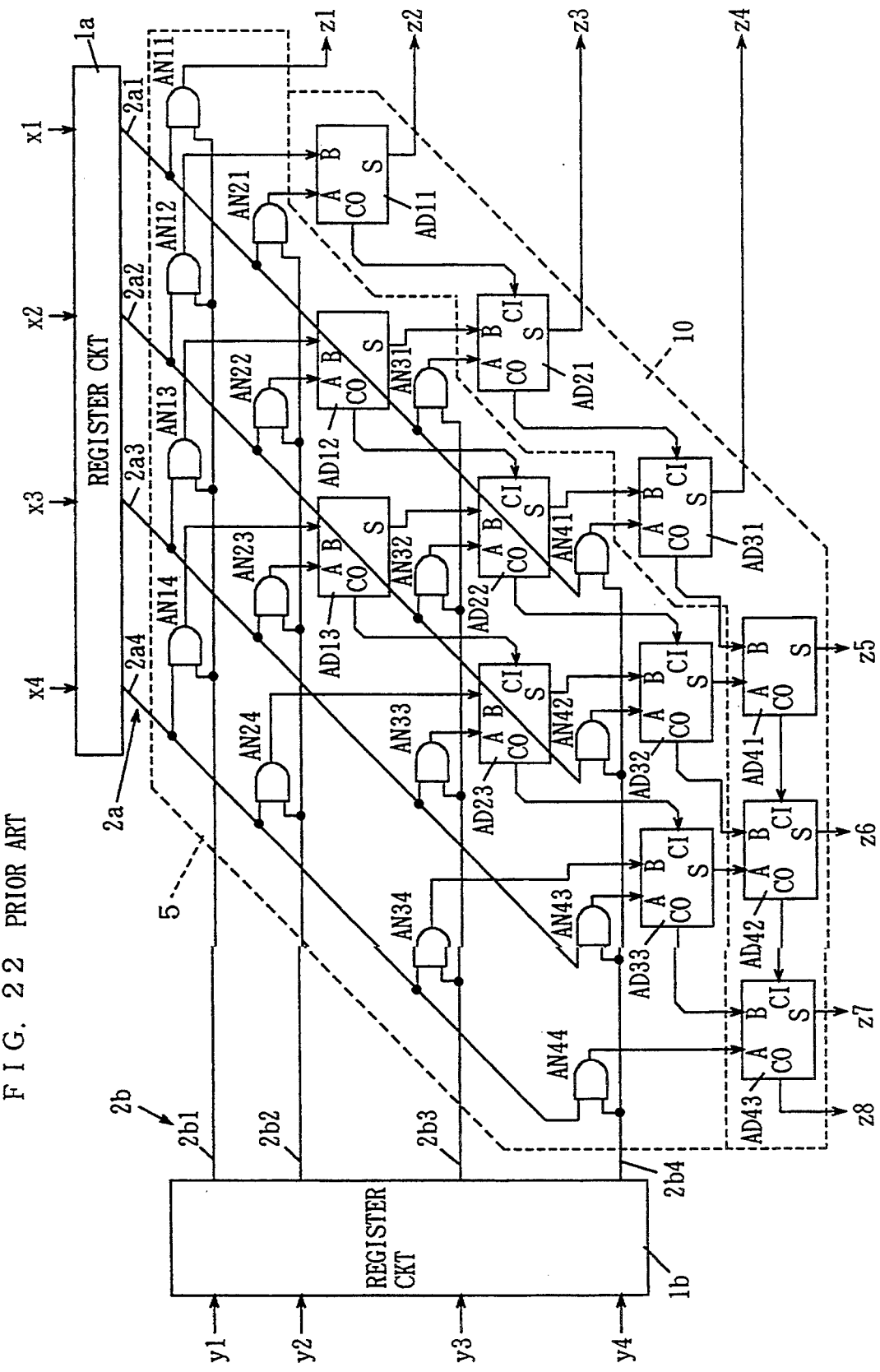
FIG. 22 is a diagram showing the structure of a conventional 4 bit multiplier.
Figures 23A, 23B:
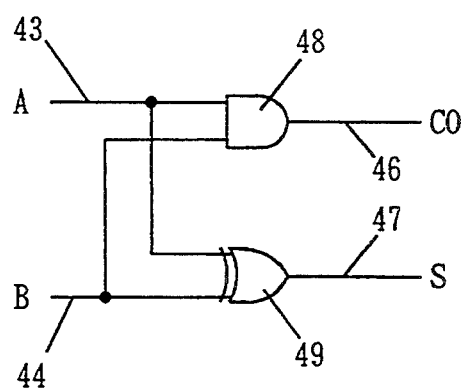
FIGS. 23A and 23B are representation showing the structure and operation of a half adder shown in FIG. 22.

The structure of the array shown in FIG. 2 is implemented by disposing a selector circuit in place of the AND circuit in the structure of the multiplier shown in FIG. 22 and shifting the position of the adders based on a Booth algorithm to be used by a prescribed numbers of bits toward more significant bits. A prescribed number of full adders 21 are provided in the V and H directions in FIG. 2. Selector circuit 22 receives multiplicand data necessary for implementing a Booth algorithm to be used (0, X, 2X in the case of the second order Booth algorithm), selects one of them based on the result of the decoding applied through output line 8, and provides the selected one to the A input of a corresponding full adder. The structure of selector circuit 22 is different between the case of using the second order Booth algorithm and the case of third order Booth algorithm. The structure will be described now.

Figure 3A:
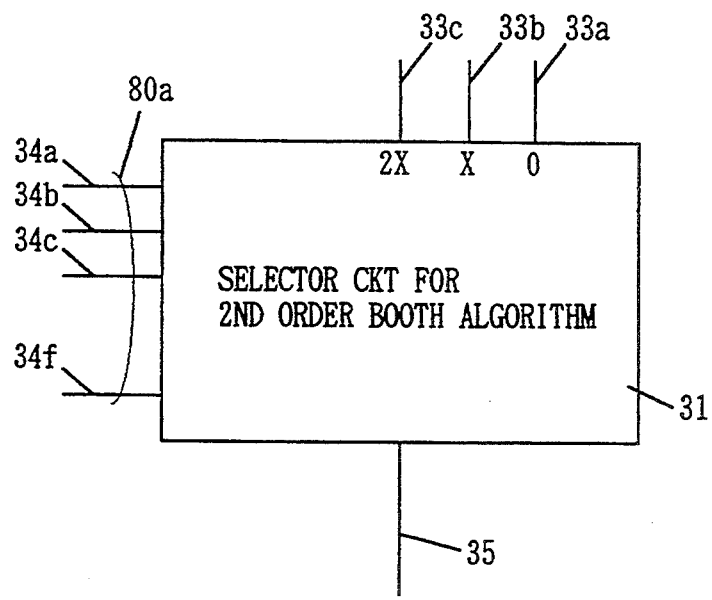
FIGS. 3A and 3B are a diagram showing the specific structure of a selector circuit shown in FIG. 2.

FIG. 3A shows the structure of a selector circuit for implementing the second order Booth algorithm. Selector circuit 31 includes an input signal line 33a for receiving a data bit 0, an input signal line 33b for receiving a data bit x, an input line 33c for receiving a data bit 2x, a control signal input line 80a for receiving a result of decoding, and an output signal line 35 for outputting a prescribed data bit based on the signal on control signal input line 80a.

Control signal input line 80a includes a control signal input line 34a for selecting the data bit 0, a control signal input line 34b for selecting multiplicand data x, a control signal input line 34c for selecting a double multiplicand data bit 2x, and a control signal input line 34f for inverting the selected multiplicand data bit. By the inversion operation by control signal input line 34f permits an operation of "—". Selector circuit 31 for the second order Booth algorithm selects an operation based on a result of decoding shown in Table 1, and one of control signal input lines 34a, 34b, and 34c is activated, with control signal input line 34f being activated based on the sign at that time.

Double data bit applied to input line 33c for receiving double data bit 2x may be produced by a shifting operation, and a hardwired arrangement which shifts the output line 2a of the multiplicand register circuit by 1 bit by means of interconnection may be employed.

Figure 3B:
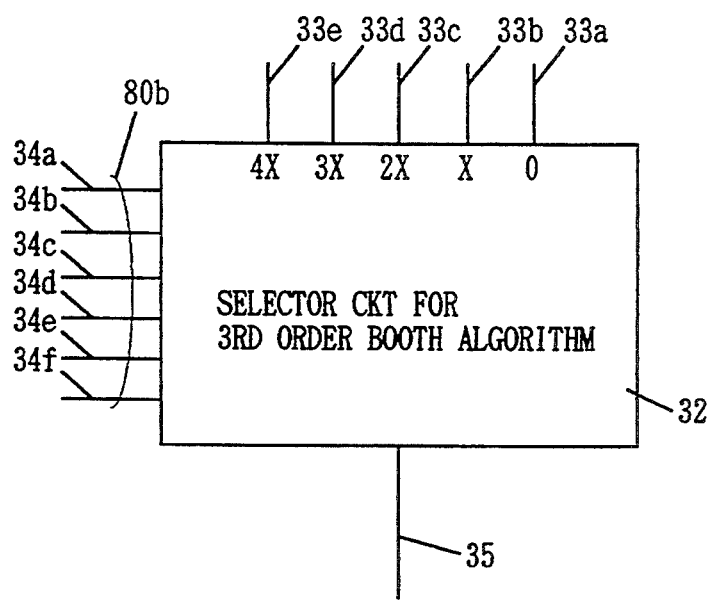

FIG. 3B illustrates the structure of a selector circuit for implementing the third order Booth algorithm included an adder array 5b shown in FIG. 1. Selector circuit 32 for the third order Booth algorithm includes an input signal line 33a for receiving a data bit 0, an input signal line 33b for receiving data bit x, an input signal line 33c for receiving double data bit 2x, an input signal line 33d for receiving triple data bit 3x from a triple producing circuit 6, an input signal line 33e for receiving quadruple data bit 4x, and a control signal input line 80b for receiving a data result signal from third order Booth decoder circuit 3b.

Control signal input line 80a includes a control signal input line 34a for selecting the data bit 0, a control signal input line 34b for selecting the data bit x, a control signal input line 34c for selecting the double data bit 2x, a control signal line 34d for selecting the triple data bit 3x, a control signal input line 34e for selecting the quadruple data bit 4x, and a control signal input line 34f for inverting the selected data bit. The output of selector circuit 32 is transferred onto an output signal line 35.

Selector circuit 32 as illustrated in FIG. 3B selects a data bit corresponding to a prescribed operation according to a decoding operation set forth in Table 2. Any structure may be employed for selector circuits 31 and 32 shown in FIGS. 3A and 3B as far as it selects a signal on a corresponding input line in response to a signal applied to a control signal input line and needs only to include the functions of a 3 to 1 multiplex circuit and a 5 to 1 multiplex circuit. Any arbitrary structure may be utilized.

Figures 24A, 24B:
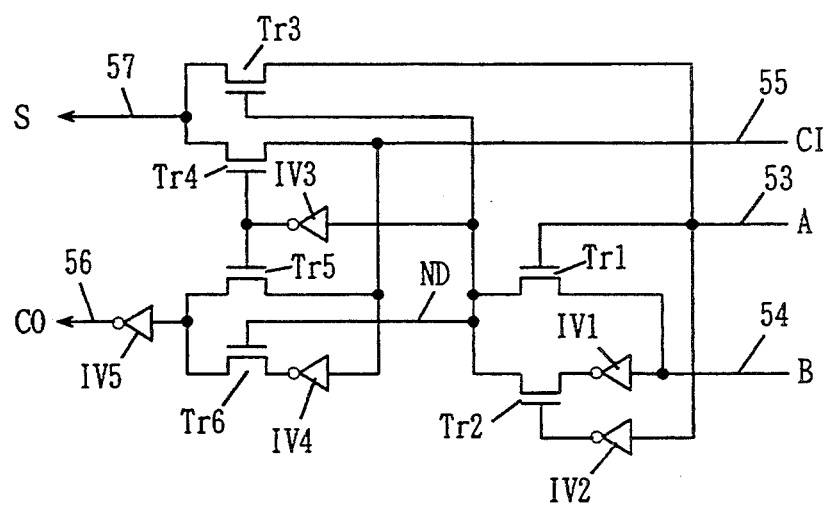
FIGS. 24A and 24B are representation showing the structure and operation of a full adder shown in FIG. 22.
Figure 25:
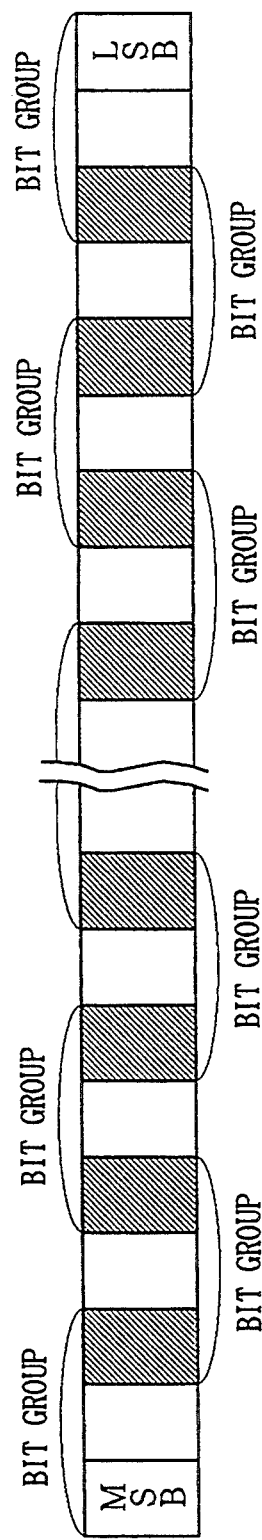
FIG. 25 is a representation showing group division of data bits in a Booth algorithm by way of example.
Figure 26:
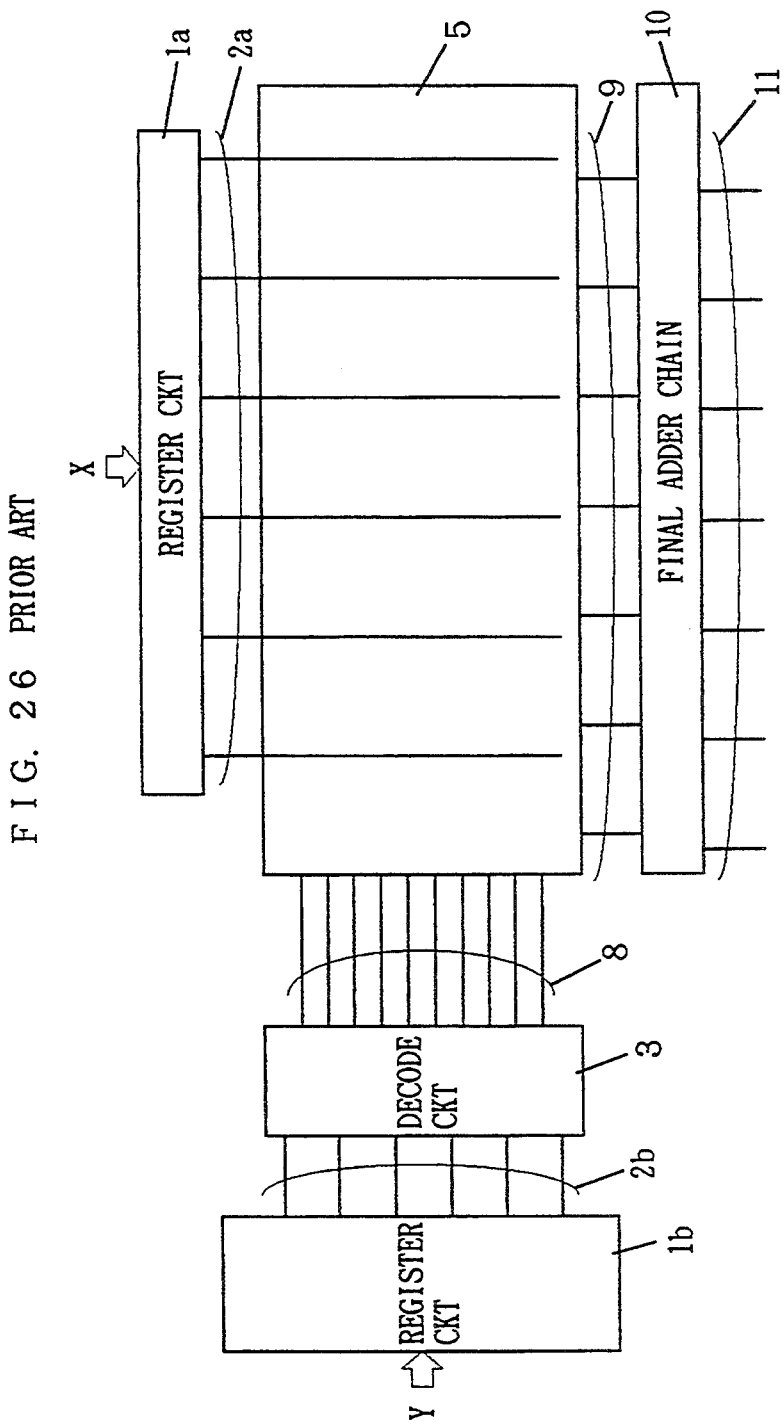
FIG. 26 is a diagram showing a structure of a multiplier utilizing a conventional Booth algorithm.
Figure 27:
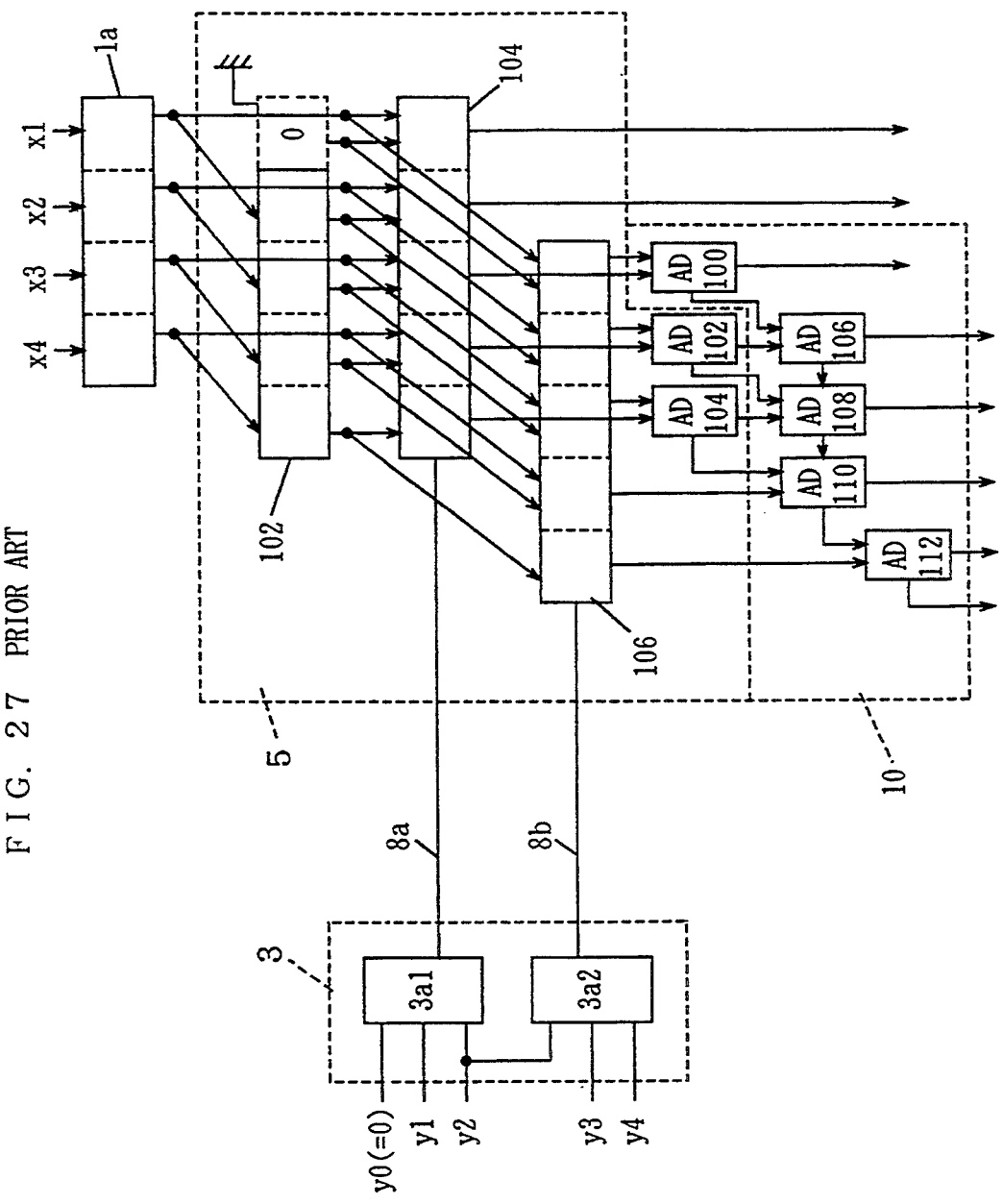
FIG. 27 is a diagram showing a structure when the second order Booth algorithm is applied to a 4 bit multiplier.
Figure 28:
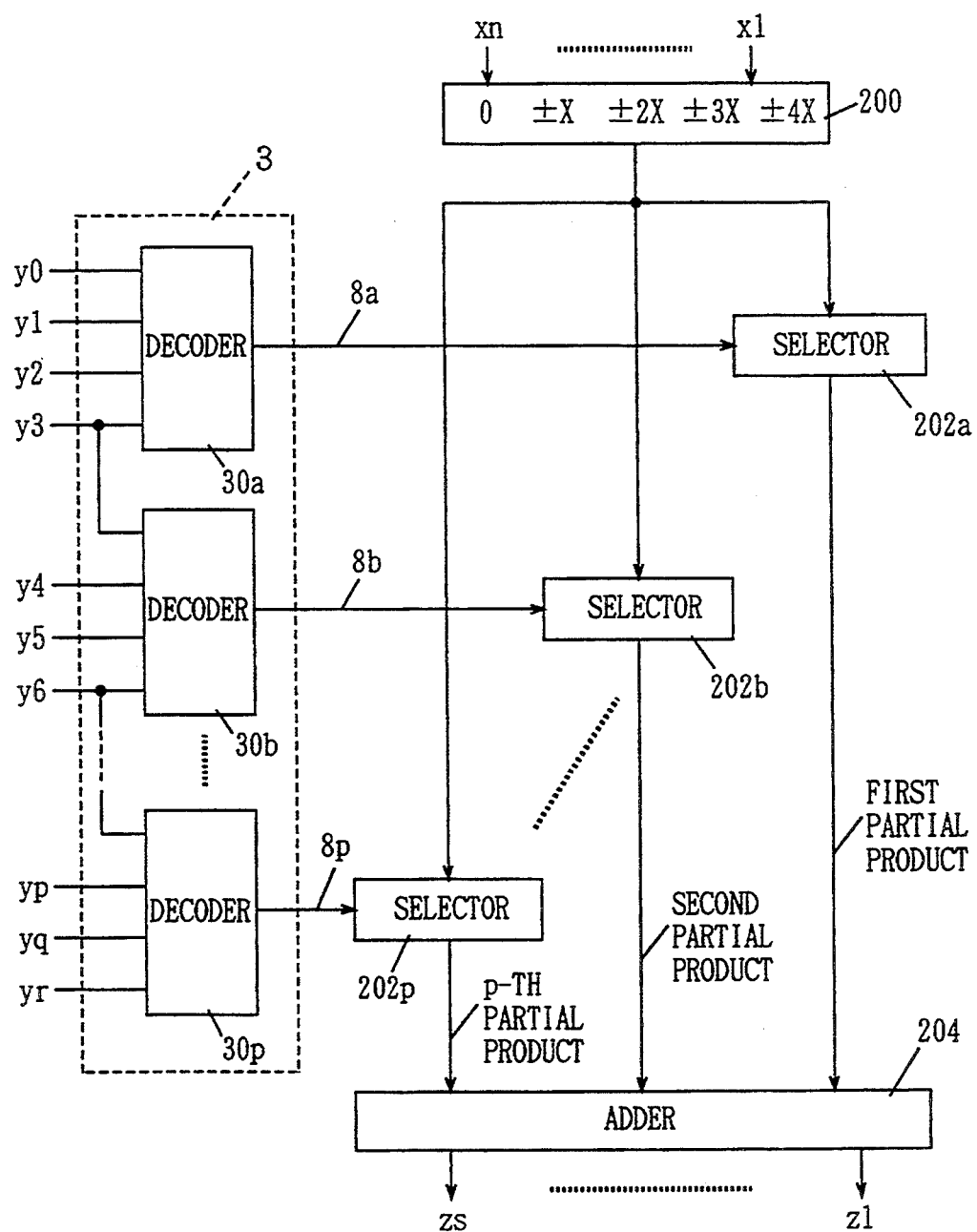
FIG. 28 is a diagram showing the structure of a conventional multiplier utilizing the third Booth algorithm.

The same structure as that illustrated in FIG. 24A at is employed for full adder 21 included in adder array 5. Another full adder structure may be employed. The full adder needs only execute a 2 input addition having a carry input CI and a carry output CO.

Figure 4:
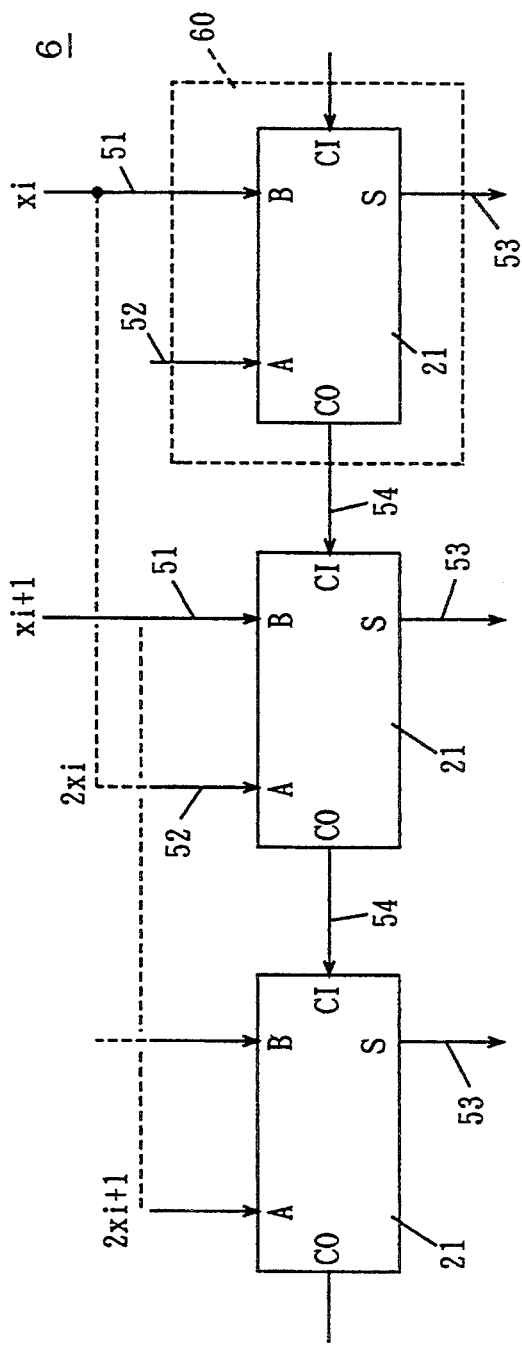
FIG. 4 is a diagram showing the specific structure of a triple producing circuit shown in FIG. 1.

FIG. 4 is a diagram showing one example of the specific structure of a triple producing circuit 6. In triple producing circuit 6, a prescribed number of basic circuits 60 formed of full adders 21 are connected in a row. Full adder 21 receives the double data bit 2x at its input A through a signal lines 52, the multiplicand data x at its input B through a signal line 51, transmits a sum output from its output S, receives at its carry input CI a carry output from full adders in the preceding stage, and transmits a carry out signal CO to the carry input of the adjacent full adder 21 through a signal line 54. The doubled multiplicand data applied onto signal line 52 can be produced simply by shifting the multiplicand data applied on signal line 51 toward more significant bits by 1 bit. Special circuits are not necessary for producing the doubled multiplicand data. It is implemented by interconnections (as shown which broken line in FIG. 4).

The second order and third order Booth decoder circuits 3a and 3b shown in FIG. 1 need only be of circuit configurations implementing the decoding operations set forth in Tables 1 and 2. Any arbitrary circuit configuration may be employed.

Final adder chain 10 shown in FIG. 1 includes the same structure as the triple producing circuit shown in FIG. 4. Corresponding inputs A and B are provided with the corresponding outputs of adders which have produced intermediate sums, and the carry output of an intermediate sum producing circuit included in the adder array. The structure is identical to the structure of the multipliers shown in FIG. 22. The specific operation will be described.

Now, the case will be described in which the multiplier Y is binary data of 54 bits and the multiplicand X is binary data of 54 bits by way of illustration. The schematic structure of this case is illustrated in FIG. 5.

Figure 5:
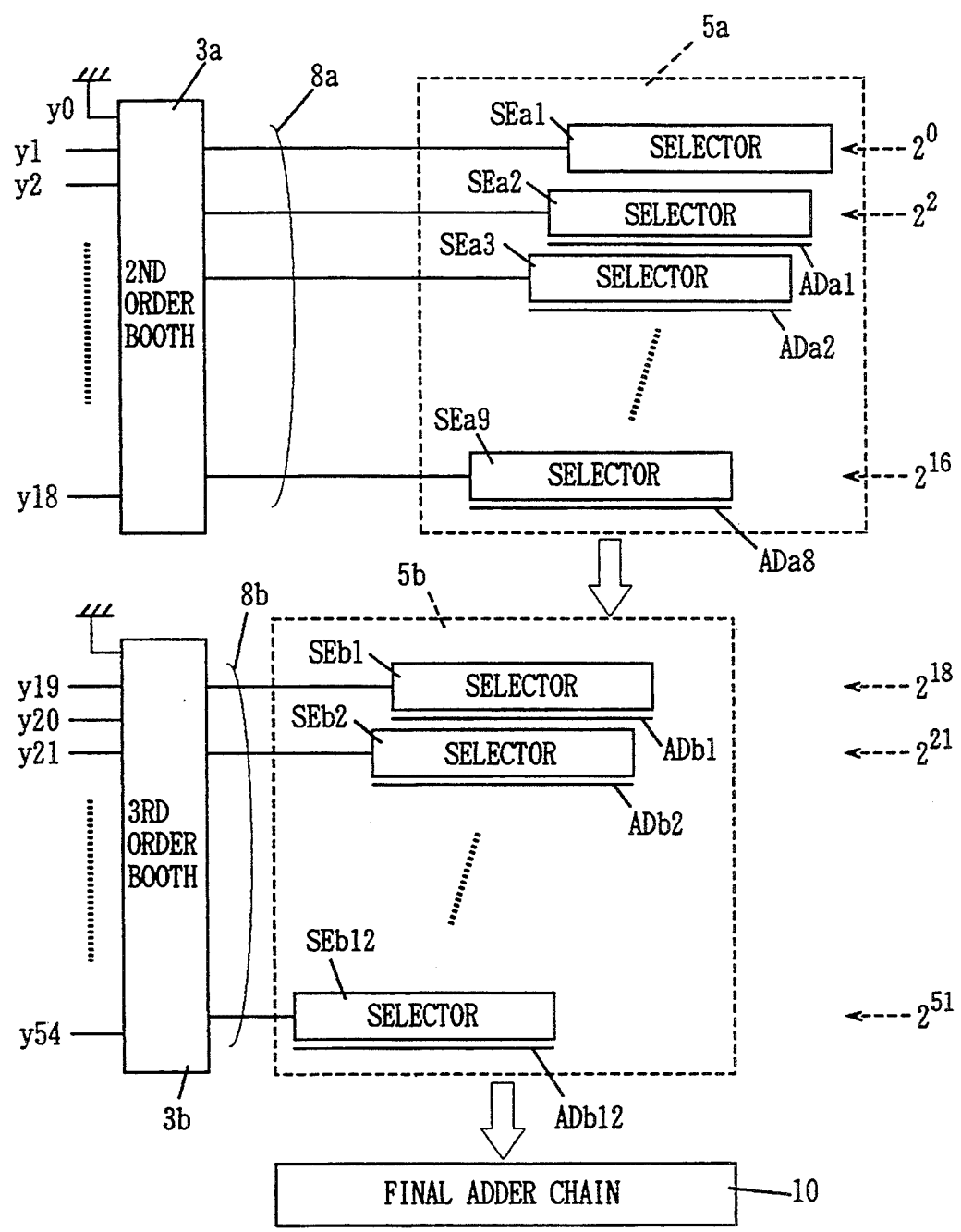
FIG. 5 is a diagram showing the specific structures of an adder array for second order Booth algorithm and an adder array for third order Booth algorithm in a 54 bit data multiplier.

FIG. 5 is a diagram showing the structure of an adder array when the multiplier Y and multiplicand X are data of 54 bits. In FIG. 5, a decoder circuit 3a for the second order Booth algorithm receives data y1–y18 of 18 bits, and also receives a ground potential ("0") as the least significant bit y0. The output line 8a of decoder circuit 3a for the second order Booth algorithm is connected to selectors SEa1–SEa9 in 9 stages. Having a multiplicand X of 54 bits, selector circuits SEa1–SEa9 each include 55-bit unit circuits (in order to produce 2X).

Partial products are produced according to the second order Booth algorithm respectively from selector circuits SEa1–SEa9. The least digits of partial products produced respectively by selector circuit SEa1–SEa9 are $2^0, 2^2, \ldots, 2^{16}$ as shown in FIG. 5 in the right half of FIG. 5. Accordingly, selector circuits SEa2–SEa9 are staggered by 2 bits in the direction of more significant bits as the stage proceeds. An adder stage ADa1 adds up the outputs of selector circuits SEa1 and SEA2. Adder stages ADa2–ADa8 adds the outputs of a corresponding selector circuits and the outputs of an adder stage in the preceding stage. Therefore, in adder array 5a according to the second order Booth algorithm, the number of stages of adders is 8.

A decoder circuit 3b for the third order Booth algorithm receives the remaining more significant 36 bits y19–y54. The least significant bit is connected to the ground potential. Decoding operation is performed with 4 bits as one set (including the first ground potential). Adder array 5b for implementing the third order Booth algorithm includes selector circuits SEb1–SEb12 in 12 stages. Adder array 5b is provided with 12 adder stages ADb1–ADb12 in order to account for the output of adder array 5a implementing the second order Booth algorithm. Adder stage ADb1 adds the output of selector circuit SEb1 and the output from adder array 5a (the output of adder stage ADa8). A partial product is produced based on the third order Booth algorithm from each of selector circuits SEb1–SEb12. The least significant digits of the partial products are $2^{18}, 2^{21}, \ldots, 2^{51}$ as shown in the right half of FIG. 5.

Now, assume that the following conditions are established. Decoder circuit 3a for performing the second order Booth algorithm and the decoder circuit 3b for performing a decoding operation based on the third order Booth algorithm each include the amount of delay which corresponds to the amount of one stage of full adders.

Selector circuits 31 for the second order Booth algorithm and selector circuit 32 for the third order Booth algorithm respectively shown in FIGS. 3A and 3B have the same amount of delay as the delay amount of one stage of a full adder.

In triple producing circuit 6 for producing 3X which is a triple of the multiplicand X, assume that time required for producing 3X which is a triple of the multiplicand X corresponds to the amount of delay of 9 stages of full adders. In this case, final adder chain 10 can be formed of a circuit identical to triple producing circuit 6 (see FIG. 4), and therefore the amount of its delay corresponds to the amount of delay of 9 stages of full adders. When (2X+X) is operated in triple (3X) producing circuit 6, the double 2X is produced by interconnections. Shift circuits are not employed for this purpose. The amount of delay of triple producing circuit 6 can be set equal to the amount of delay of final adder chain 10. Herein, triple producing circuit 6 and final adder chain 10 include 54 stages of full adders (carry propagation). Accordingly, there actually exist the amount of delay of 54 stages of full adders. This delay is set to correspond to the delay amount of 9 stages of full adders by means of high speed operation technique such as CLA (Carry Look Ahead). The amount of delay is set for the sake of convenience and not uniquely fixed in practice.

As illustrated in FIG. 5, among the 54 bits y1–y54 of the multiplier Y, the less significant 18 bits y1–y18 are connected to decoder circuit 3a for the second order Booth algorithm, and the more significant 36 bits y19–y54 are connected to decoder circuit 3b for the third order Booth algorithm. In this case, as illustrated in FIG. 5, the amount of delay within adder array 5a for the second order Booth algorithm corresponds to the amount of delay for 8 stages of full adders (as shown in FIG. 2, the carry output CO of a full adder is applied to the carry input of a full adder in the next stage). Similarly, the amount of delay within adder array 5b for the third order Booth algorithm is equal to the amount of delay for 12 stages of full adders.

Usually, when a multiplication is performed utilizing the third order Booth algorithm, the amount of delay generated in an operation associated with the multiplication includes the amount of delay generated by adders included in the adder array, and the amount of delay necessary for producing a triple pf a multiplicand.

In this embodiment, the amount of delay necessary for producing the triple of multiplicand X (assume to be the amount of 9 stages of full adders) is hidden in a time period for adding utilizing a second order Booth algorithm (the amount of delay for 8 stages of full adders in adder array 5a plus the amount of delay in decoder circuit 3a based on the second order Booth algorithm, in other words, the period for 9 stages of full adders). Accordingly, it is not necessary to consider the amount of delay necessary for producing the triple number of the multiplicand in the multiplication operation.

More specifically, when the multiplicand data X is applied on the multiplicand data line 2a by register circuit 1a, the triple number of the multiplicand X is produced in triple producing circuit 6 in parallel with arithmetic operations in decode circuit 3a for the second order Booth algorithm and adder array 5a. Adder array 5b adds up the produced partial products utilizing the second order Booth algorithm. Accordingly, the amount of delay necessary for producing the triple number of the multiplicand X is hidden. Thus, the use of the third order Booth algorithm reduces the number of partial products produced and permits a high speed multiplication operation.

Figure 6:
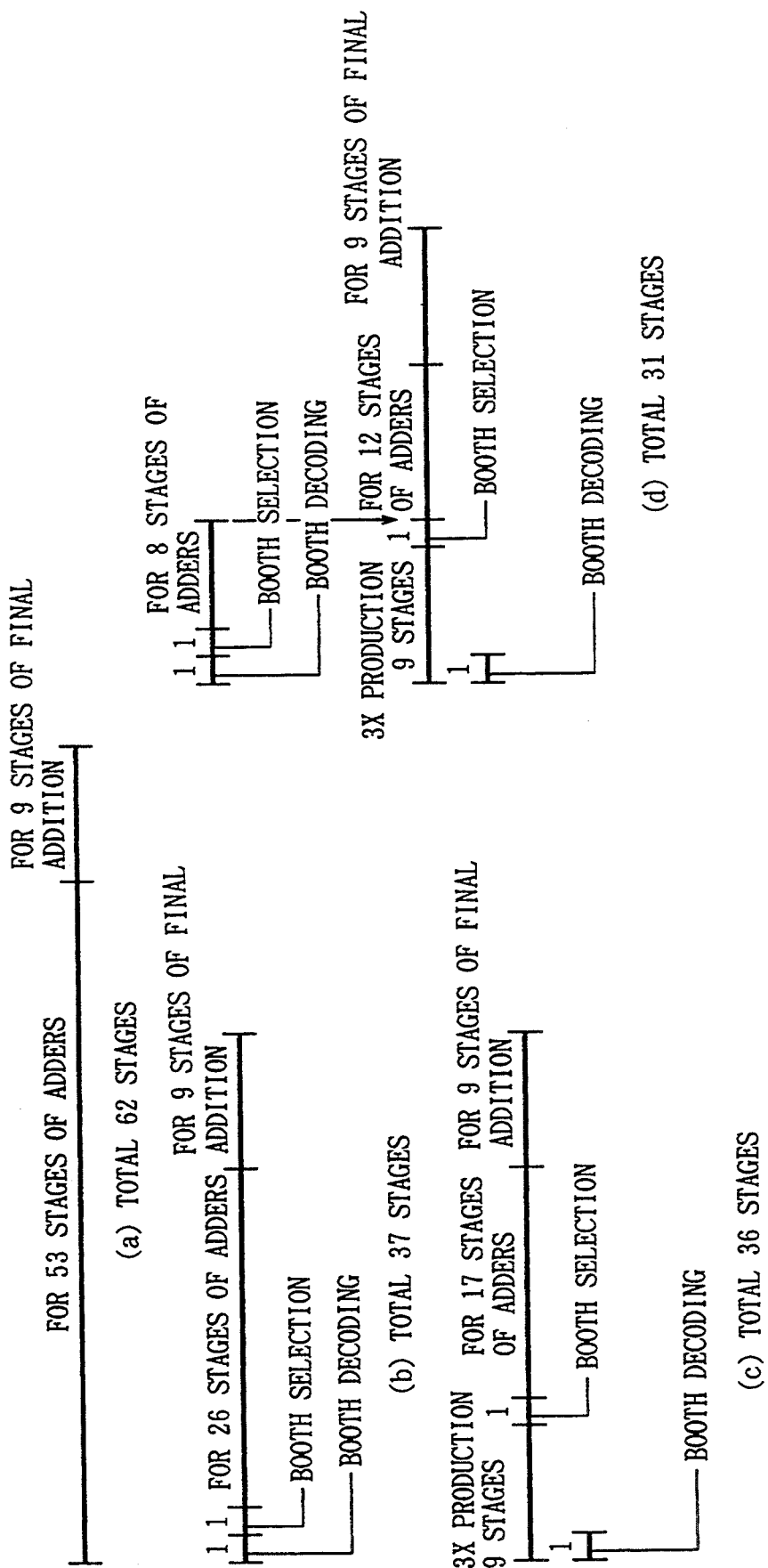
FIG. 6 is a representation showing time necessary for multiplication operation in comparison between the first embodiment and a conventional example.

FIG. 6 is a representation showing in comparison the amount of delay in a conventional multiplier and the amount of delay in a multiplier according to the embodiment.

As illustrated in FIG. 6 at (a), when the multiplier as shown in FIG. 22 is employed, for example, 54 partial products are produced. Therefore, the amount of delay for 53 stages of full adders will be necessary for producing an intermediate sum. It is assumed that the amount of delay in the final adder column corresponds to the amount of delay for 9 stages of full adders. Accordingly, in the case of the conventional multiplier, the amount of delay for 62 stages of full adders will be necessary.

FIG. 6 at (b) shows the amount of delay in a multiplier to which only the second order Booth algorithm is applied. The amount of delay in the Booth decoder circuit corresponds to the amount of delay for one stage of full adders. Thus, the amount of delay for one stage of full adders will be necessary for a selection operation based on the Booth algorithm included in the adder array. When the second order Booth algorithm is utilized, since 27 partial products are produced, the amount of delay for 26 stages of adders is generated in the adder array. It is assumed that the amount of delay in the final adder column is for 9 stages of full adders. Therefore, if only the second Booth algorithm is utilized, the amount of delay for 37 stages of full adders will be necessary for multiplying data of 54 bits.

FIG. 6 at (c) illustrates the amount of delay in a multiplier to which only the third Booth algorithm is applied. The amount of delay for one stage of full adders is necessary for a decoding operation based on the Booth algorithm. The decoding operation is executed in parallel with a 3X producing operation for producing a triple of the multiplicand X. The amount of delay for 9 stages of full adders is necessary for producing 3X. Subsequently, a selecting operation based on the Booth algorithm is performed. This requires the amount of delay for one stage of a full adder. In order to produce an intermediate sum, for the third Booth algorithm, since 18 partial products are produced, the amount of delay for 17 stages of full adders is necessary. In the final addition, the delay for 9 stages of full adders all together is generated. Accordingly, if only the third Booth algorithm is utilized, the amount of delay for 36 stages of full adders will be necessary.

FIG. 6 at (d) shows the amount of delay when the second Booth algorithm and the third Booth algorithm are utilized in combination according to the embodiment. For the portion utilizing the second Booth algorithm, the amount of delay for one stage of full adders necessary for a decoding operation, the amount of delay for one stage of full adders necessary for a selecting operation, and the delay for 8 stages of adders for producing an intermediate sum are generated. In parallel with a multiplication operation utilizing the second order Booth algorithm, production of 3X is performed. The 3X production requires the amount of delay for 9 stages of full adders. For a decoding operation based on the third Booth algorithm, the amount of delay for one stage of full adders is generated. The 3X production and the decoding operation based on the third order Booth algorithm are executed in parallel. For a selecting operation based on the third order Booth algorithm, the amount of delay for one stage of full adder is generated. Accordingly, the delay for 10 stages of full adders is generated until the selection operation based on the third order Booth algorithm is completed. The delay for 10 stages of full adders necessary until the selection operation based on the third order Booth algorithm is completed is equal to the delay necessary until the addition operation utilizing the second order Booth algorithm (intermediate sum production) is completed. The multiplication operation utilizing the second order Booth algorithm and the 3X producing operation are executed in parallel. The multiplication operation utilizing the third order Booth algorithm generates the delay for 12 stages of adders and the delay for 9 stages of full adders is generated in the final addition operation. Accordingly, the delay for 31 stages of full adders all together will be necessary.

In the above assumption, time at which the multiplier Y and the multiplicand X are latched in the register circuit is set to be 0, and signal propagation delay through interconnections are the same for all the multipliers and ignored. As can be seen from FIG. 6, in the structure of the multiplier according to the invention, time required for the multiplication operation is greatly reduced.

In the above description, it is assumed that time required for producing the tripled number 3X is equal to the amount of delay of 9 stages of full adders. The delay changes depending upon the structure of 3X producing circuit 6. Using time required for producing 3X as a reference, the number of less significant bit number of the multiplier Y used for performing a multiplication operation according to the second order Booth algorithm is adjusted. When a multiplication operation is performed according to the second order Booth algorithm, if the number of multiplier data bits is $2p$, time required for producing 3X requiring the amount of delay for $(p-1)$ stages of full adders is given as follows:

$$T = k \cdot t = ((p-1)+1)t = p \cdot t$$

where t represents the amount of delay for one stage of a full adder. Accordingly, $k = p$ holds, in other words the number of stages of full adders included in the delay necessary for producing 3X is equal to ½ the number of the less significant bits of the multiplier Y to be multiplied based on the second order Booth algorithm. Accordingly, the production of 3X and the multiplication operation based on the second order Booth algorithm can be executed in parallel, and a multiplication circuit capable of performing a high speed multiplication operation is provided.

EMBODIMENT 2

As described in above, when the third order Booth algorithm is utilized, a long period of time is necessary for producing a tripled number of the multiplicand X, which cancels the effect of the Booth algorithm reducing the number of partial products. In the following, a structure for performing a high speed multiplication operation based on the third order Booth algorithm by excluding delay generated by the 3X production.

Figure 7:
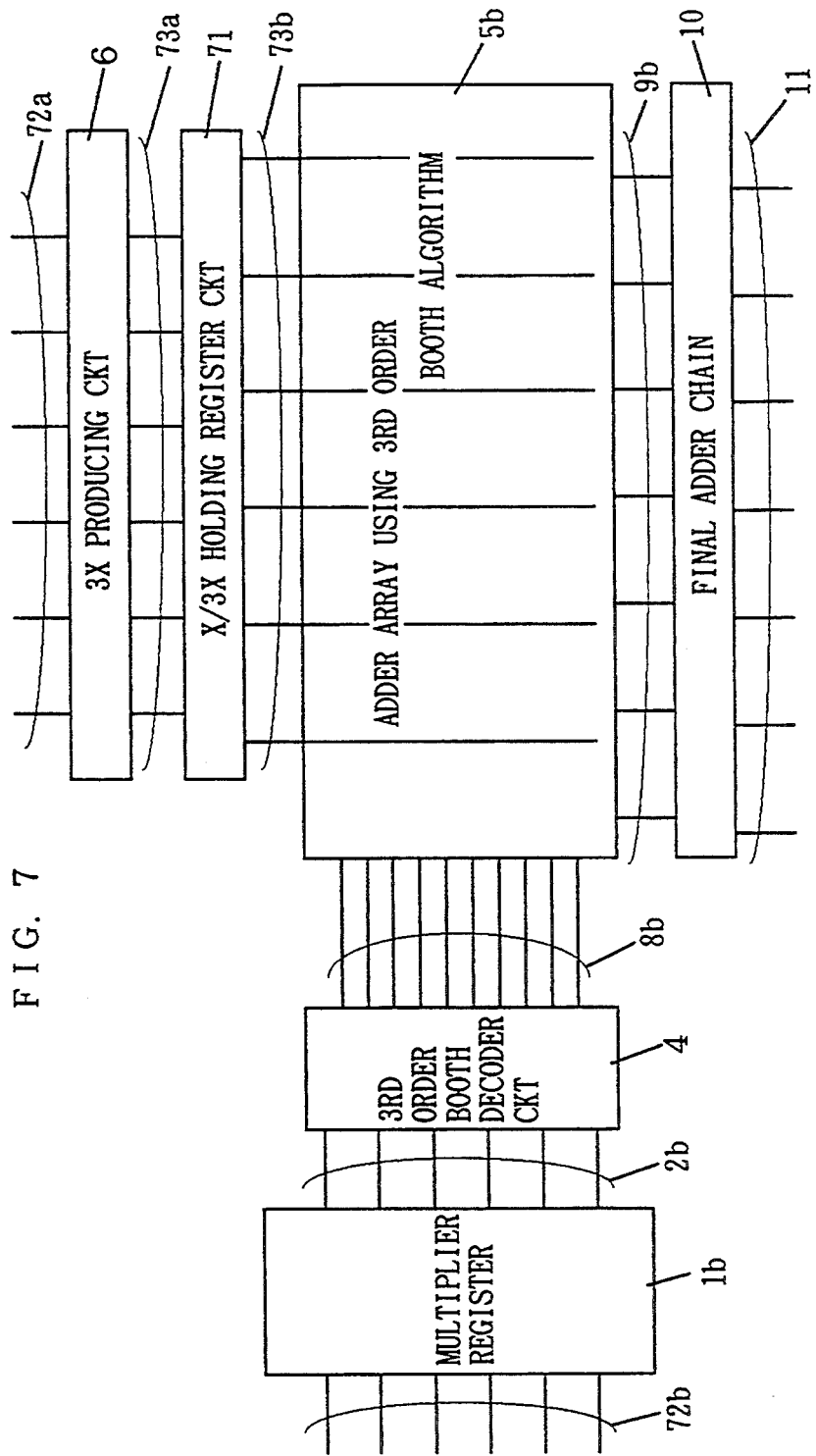
FIG. 7 is a diagram showing a multiplier according to a second embodiment of the invention.

FIG. 7 is a diagram showing the entire structure of a multiplier according to a second embodiment of the invention. In FIG. 7, the multiplier includes a multiplier register circuit 1b for receiving multiplier data Y through a signal line 72b and holding the same, a third order Booth decode circuit 4 for receiving the multiplier data held at multiplier register circuit 1b through a data line 2b and performing a decoding operation based on the third order Booth algorithm, a 3X producing circuit 6 for receiving the multiplicand X through a signal line 72a and producing the tripled number 3X of multiplicand X, an X/3X holding register circuit 71 for receiving the tripled number 3X produced at 3X producing circuit 6 and the multiplicand X through a signal line 73a and holding them, an adder array 5b for receiving the output of register circuit 71 and performing a multiplication utilizing the third order Booth algorithm in response to a decoding result signal from the third order Booth decode circuit 4, and a final adder chain 10 for adding up intermediate sums from adder array 5b and outputting a final multiplication result onto a signal line 11. Adder array 5b includes a selector for executing a selecting operation based on the third order Booth algorithm.

In the structure of the multiplier shown in FIG. 7, the tripled number 3X of the multiplicand X is produced in 3X producing circuit 6 before the multiplicand X is latched in register circuit 71. Therefore, the multiplicand X and the tripled number 3X are applied to adder array 5b in parallel. The delay necessary for producing the tripled number data in the multiplication operation in the adder array is not generated. Therefore, a multiplication can be performed based on the third order Booth algorithm at a high speed.

FIG. 8 illustrates time required for the multiplication in the multiplier shown in FIG. 7. In the time delay shown in FIG. 8, the assumption applied to the previous EMBODIMENT 1 is used. The multiplier data Y is of 54 bits, the delay for one stage of full adders is required each for a Booth decoding operation and a Booth selecting operation, and it is assumed that the delay for 9 stages of full adders are generated for the final addition and then 3X production. In the case of the third order Booth algorithm, in the adder array, since (54/3)−1=17, delay for 17 stages of adders is generated. When the tripled number 3X is produced after holding the multiplicand X at the register circuit, the amount of time delay required corresponds to delay for 36 stages of full adders.

Meanwhile, if the tripled number 3X is produced before the multiplicand X is latched in the register circuit, time required from the multiplicand X is latched in the register circuit until the multiplication operation is completed is equal to the amount of delay for 28 stages of full adders. Clearly, time required for the production of the tripled number 3X is excluded, and therefore the multiplication based on the third order Booth algorithm can be executed at a high speed.

It is noted that if the multiplicand X and the tripled number 3X are held at X/3X holding register circuit 71, the structure can be employed in which each bit of the multiplicand X and each bit of the tripled number 3X are alternately arranged.

As described above, before inputting the multiplicand into the multiplicand register circuit, the tripled number 3X is produced in the 3X producing circuit and the tripled number 3X and the multiplicand X are held in the register circuit, so that a multiplication can be performed at a high speed.

EMBODIMENT 3

Figure 9:
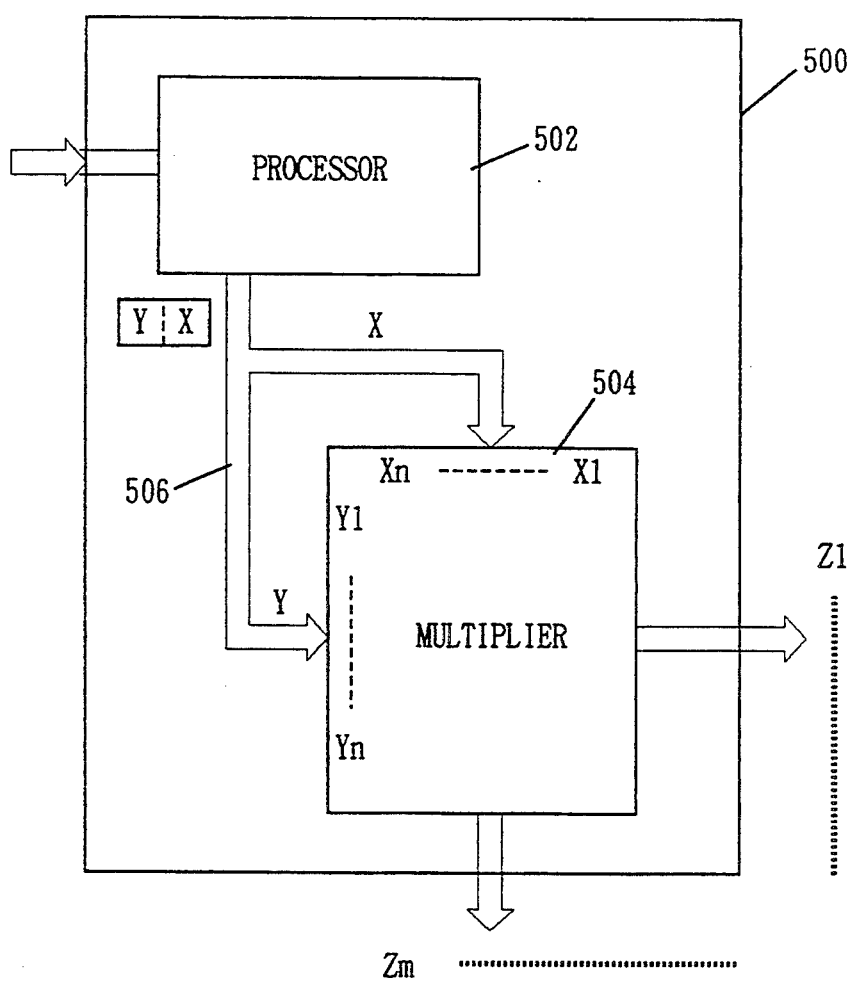
FIG. 9 is a diagram showing the specific structure of an integrated circuit device including a multiplier.

FIG. 9 is a diagram showing the structure of a system including a multiplier. In FIG. 9, an integrated circuit device 500 includes a processor 502 for processing externally applied data and producing data to be multiplied, in other words, multiplier data Y and multiplicand data X, and a multiplier 504 for receiving the multiplicand data X and the multiplier data Y and multiplying them. Processor 502 may be an arbitrary processor. Any processor can be employed if it can process data to be multiplied. The data X and Y are applied to multiplier 504 from processor 502 through a data bus 506. In data bus 506, the multiplier data Y is arranged in the more significant bits, while the multiplicand data X is arranged in the less significant bits. Accordingly, usually in multiplier 504, the multiplicand data X is input from its one side (in the upper portion in FIG. 9), and the multiplier data Y is applied from the other side (the left side portion of multiplier 504 in FIG. 9). An output from multiplier 504 is output from the right side and the bottom side in FIG. 9. This is because a result of multiplication by integrated circuit device 500 is supplied through output pin terminals which in turn are arranged along the adder array for fast data outputting. Therefore, in multiplier 504, the multiplier register circuit is disposed along the left side of the adder array, and the multiplicand register circuit is disposed along the upper side of the adder array.

Figure 10:
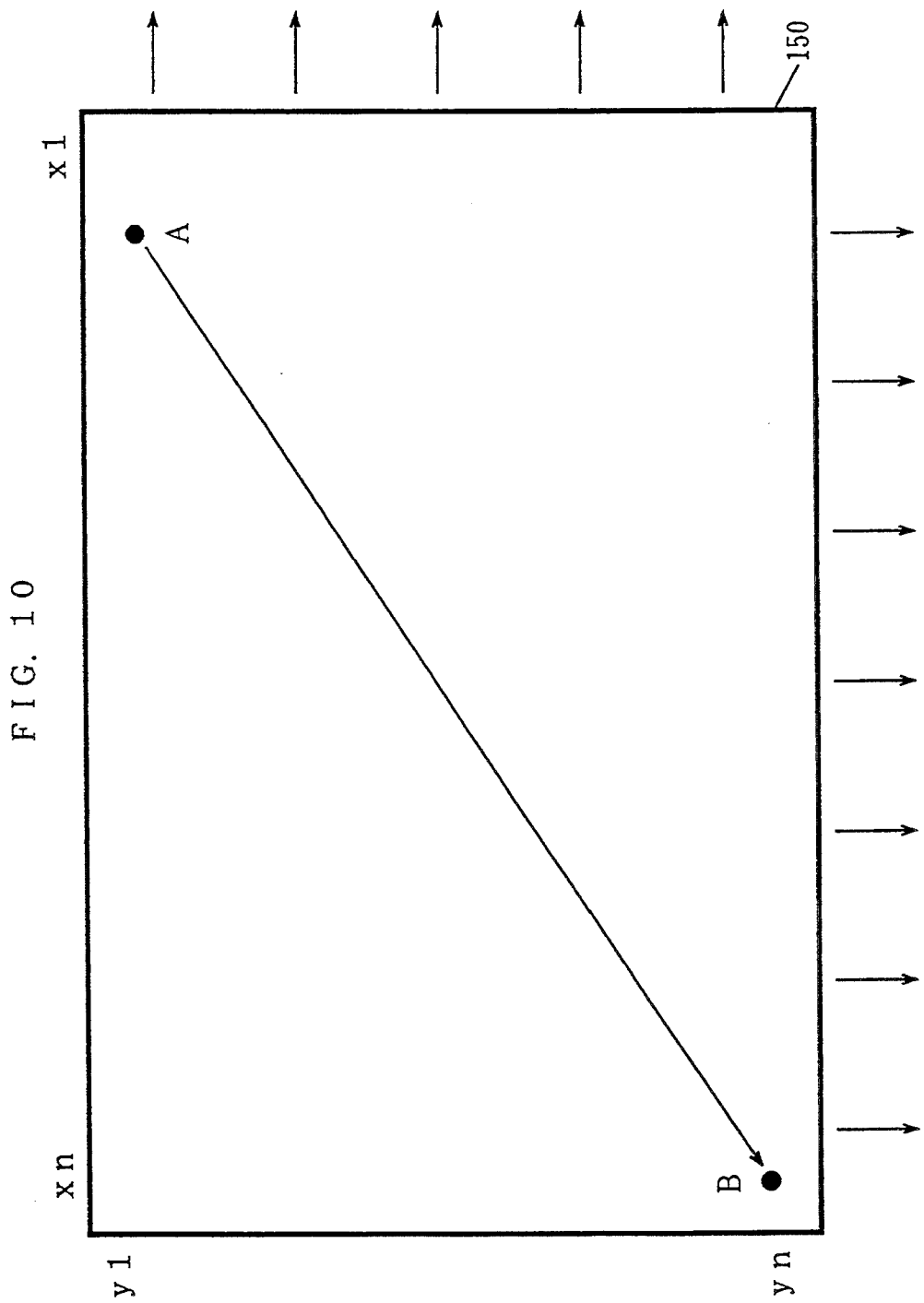
FIG. 10 is a representation showing the direction of propagation of a signal in an adder array.

FIG. 10 is a representation showing the propagation path of a signal in an adder array 150 included in the multiplier. Adder array 150 may include an adder array for producing an intermediate sum and a final adder chain for producing a final product. In adder array 150, the most significant bit and least significant bit of the multiplicand X are xn and x1, and the most significant bit and least significant bit of the multiplier Y are yn and y1, respectively. In this case, the signal propagates form point A to point B (see the arrangement of multiplier array in FIG. 22, for example). This is because in the adder array, the carry output of an adder is transmitted to the carry input or one input of an adder provided at an adjacent more significant bit in the next stage. The signal propagation path decides delay time in the adder array. It is preferable that in adder array 150, a signal at the upper right portion is decided before a signal at the lower left portion.

Loads such as selector and AND circuits are associated with signal lines for transmitting the multiplier data. Usually, if multiplication data is beyond 16 bits, these loads take significant values which cannot be ignored, and a resultant signal propagation delay cannot be ignored. The multiplier data or Booth decoding result signal reaches point B before point A in FIG. 10. An addition (multiplication operation) in adder array 150 is initiated from the time point at which the determined data has reached point A. Therefore, the signal propagation delay of the multiplier data of Booth decoding result impairs the high speed characteristics of the multiplication. The structure overcoming this disadvantage will be described.

Figure 11:
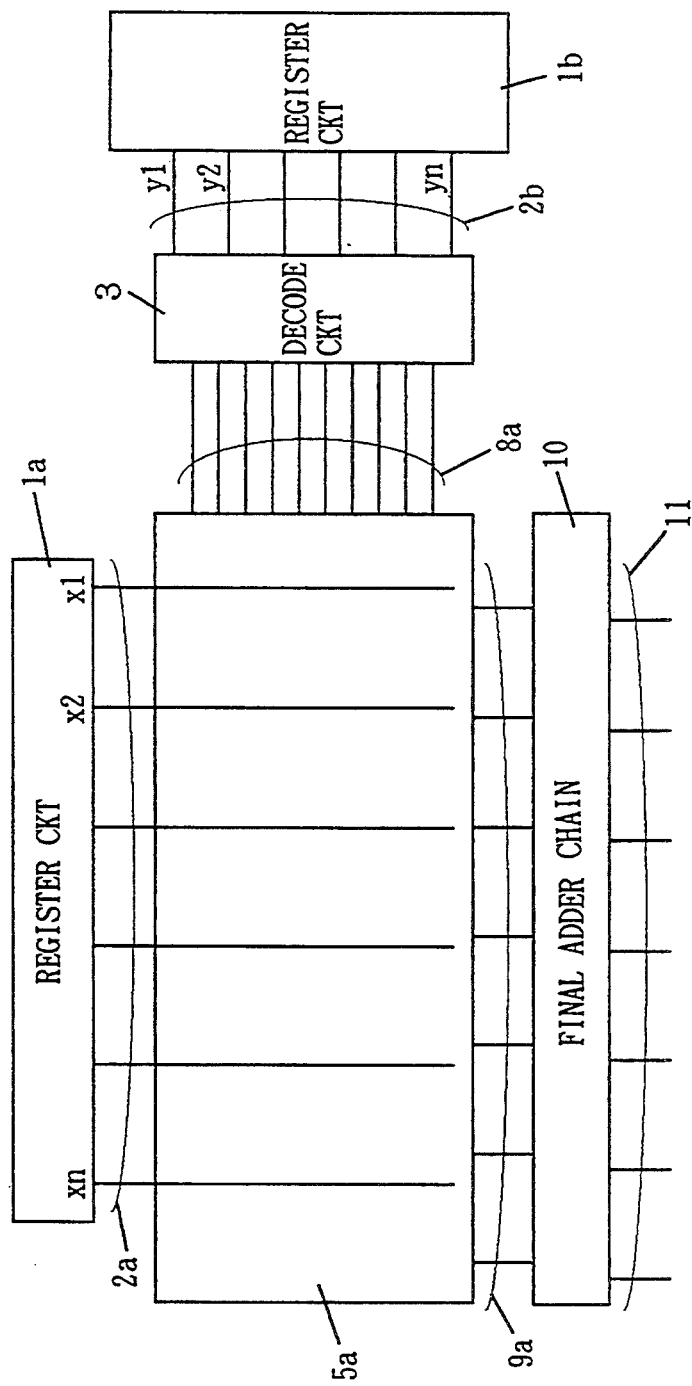
FIG. 11 is a diagram showing the structure of a multiplier according to a third embodiment of the invention.

FIG. 11 is a diagram showing a structure of a multiplier according to a third embodiment of the invention. In FIG. 11, the structure of a multiplier utilizing the second order Booth algorithm is illustrated by way of example. In FIG. 11, provided along the right side of adder array 5a are a register circuit 1b for holding the multiplier data Y and a decode circuit 3 for receiving the multiplier data Y (data bits y1-yn) transmitted from register circuit 1b through a data line 2b and performing a decoding operation based on the second order Booth algorithm. More specifically, the circuit portion for producing the multiplier data and the Booth decoding result are provided on the side of the less significant bit x1 of the multiplicand data X and the less significant bit y1 of the multiplier data Y is provided to be output close to the register circuit for holding the multiplicand data X.

Adder array 5a includes a selection circuit using the second order Booth algorithm, and produces partial products based on the second order Booth algorithm and adders for adding up the partial products to produce an intermediate sum. The output of adder array 5a is provided to final adder chain 10 through a data line 9a. The result of product is transmitted onto data line 11 from final adder chain 10.

In the case of the arrangement shown in FIG. 11, the Booth decoding result is input from the less significant bit side of the multiplicand data X of adder array 5a. More specifically, a signal reaching point A in FIG. 10 is determined before a signal reaching point A. In adder array 5a, a signal propagates along the diagonal direction of adder array 5a from the less significant bits of the multiplicand data X. The signal lines of the more significant bits only need to receive determined data before the result of multiplication of less significant bits is determined even if a signal propagation delay is generated. Therefore, as illustrated in FIG. 11, decode circuit 3 inputs the decoding result output of its less significant bits from the side of the less significant bit position of the multiplicand data to adder array 5a, and therefore the multiplication operation can be performed at a high speed free from the influence of propagation delay of the signal representing the result of decoding in adder array 5a.

Figure 12:
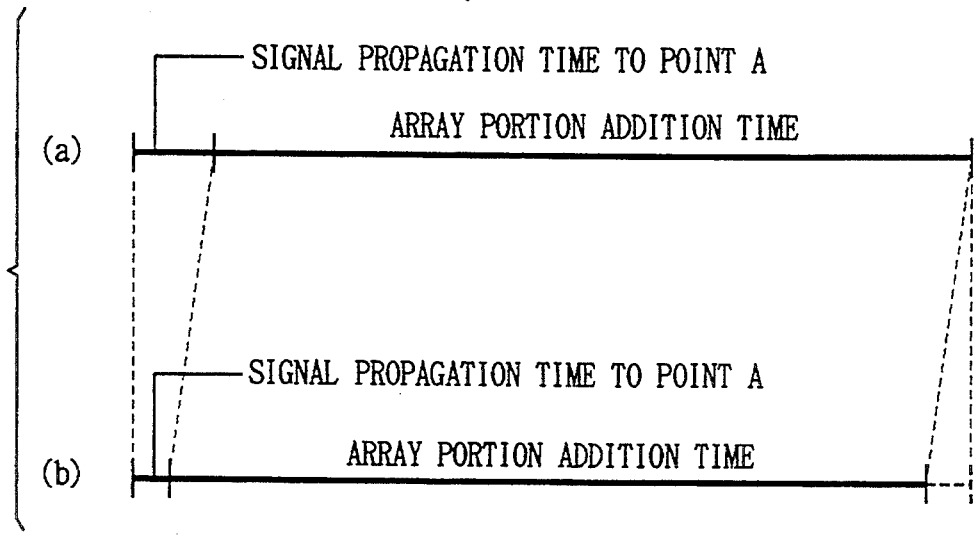
FIG. 12 is a representation showing the advantageous effect of the multiplier shown in FIG. 11.

FIG. 12 is a representation showing the effect of the third embodiment according to the invention. In FIG. 12 at (a), time for operation when the multiplier data Y is input from the side of the more significant bits of the multiplicand data X is shown, and in FIG. 12 at (b), time for operation when the multiplier data Y is input from the side of the less significant bits of the multiplicand X as shown in FIG. 11. Time for the multiplier data (Booth decoding result) to be transmitted to point A is reduced, when input from the side of the less significant bits of the multiplicand data and time required for operation is reduced by the amount of that time. Time required for addition by the array portion is the same.

A multiplier using the second order Booth algorithm in the structure shown in FIG. 11 is illustrated. The same effect can be provided in a multiplier which does not use the Booth algorithm. The Booth algorithm to be used may be the third order or higher order Booth algorithm. More specifically, in any of the cases total time required for multiplication operation is reduced by inputting the multiplication data or the Booth decoding result into the adder array from the side of the less significant bits of the multiplicand data X.

In the structure shown in FIG. 11, Booth decode circuit 3 and register circuit 1b for holding the multiplier data are disposed on the side of the less significant bits of the multiplicand data. The result of multiplication is output from adder array 5a toward decode circuit 3 and register circuit 1b (see FIG. 10). In this case, a multi-layer interconnection structure is employed in which the product result from the adder array is led out through an interconnection layer different from data lines 8a and 2b.

Figure 13:
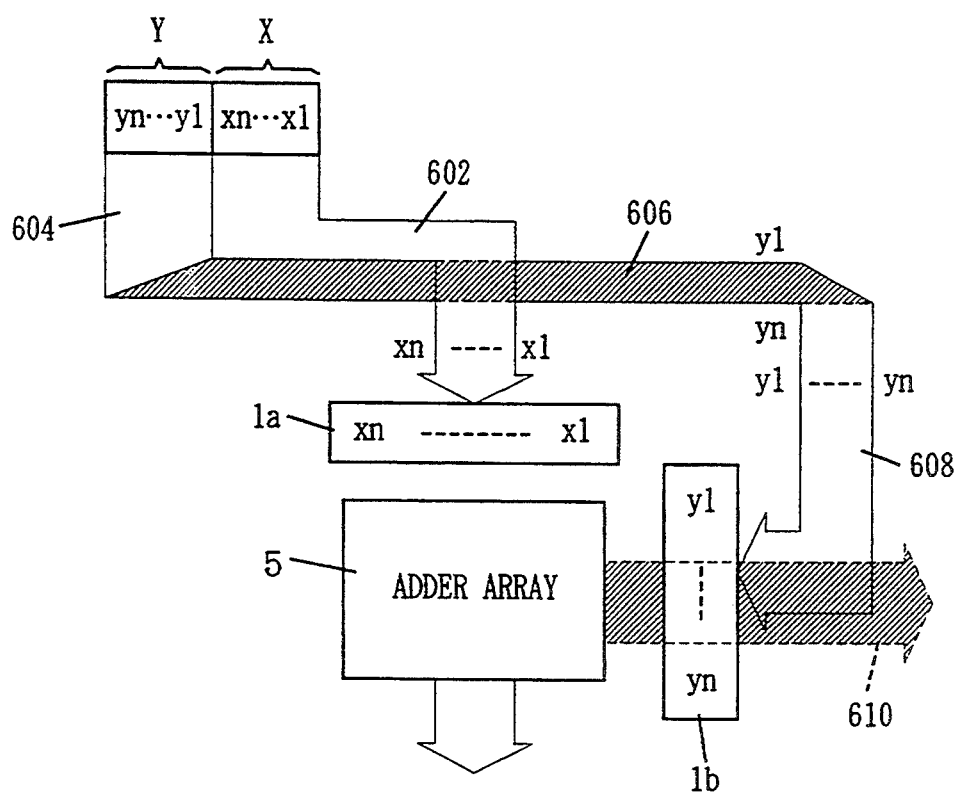
FIG. 13 is a representation showing an interconnection structure for implementing the multiplier shown in FIG. 11.

FIG. 13 is a representation showing the interconnection structure of the signal line transmitting the multiplier data and the multiplicand data implementing the arrangement of FIG. 11. In FIG. 13, the multiplicand data X is transmitted to register circuit 1a by a first level interconnection layer 602. The order of arrangement of data bits are maintained as they are supplied from a processor. The multiplier data Y is first transmitted from a first level interconnection layer 604. First level interconnection layer 604 is in turn connected to a second level interconnection layer 606. Second level interconnection layer 606 crosses over first layer interconnection layer 602 transmitting the multiplicand data X. Then, second level interconnection layer 606 is once again connected to a first level interconnection layer 608. By the connection between second level interconnection layer 606 and first level interconnection layer 608, the order of arrangement of the multiplier data bits y1-yn is reversed. First level interconnection layer 608 is extended to register circuit 1b for storing the multiplier. Thus, the structure in which the least significant bit y1 of the multiplier data Y is arranged close to the least significant bit x1 of the multiplicand data X can be implemented. An output from adder array 5 is formed of a data line formed of a second layer interconnection layer 610. Thus, a product can readily be output if multiplier register circuit 1b (and Booth decode circuit) is arranged on the right side of adder array 5 (in FIG. 13). Here, the terms of "first level interconnection layer" and "second level interconnection layer" are used simply for the purpose of convenience, and do not specifically mean interconnection layers to be disposed first and second on a semiconductor substrate in constructing an actual multiplier. The terms are used simply for indicating that interconnection layers transmitting data are in different layers.

EMBODIMENT 4

As illustrated in FIG. 11, when register circuit 1b for multiplier and Booth decode circuit 3 are arranged on the side of the less significant bits of the multiplicand data X, an output can be led out from the adder array by the use of the multilayer interconnection structure. This however reduces the flexibility in layout of interconnection. Therefore, a structure greatly improving the flexibility of interconnection layout will be described.

Figure 14:
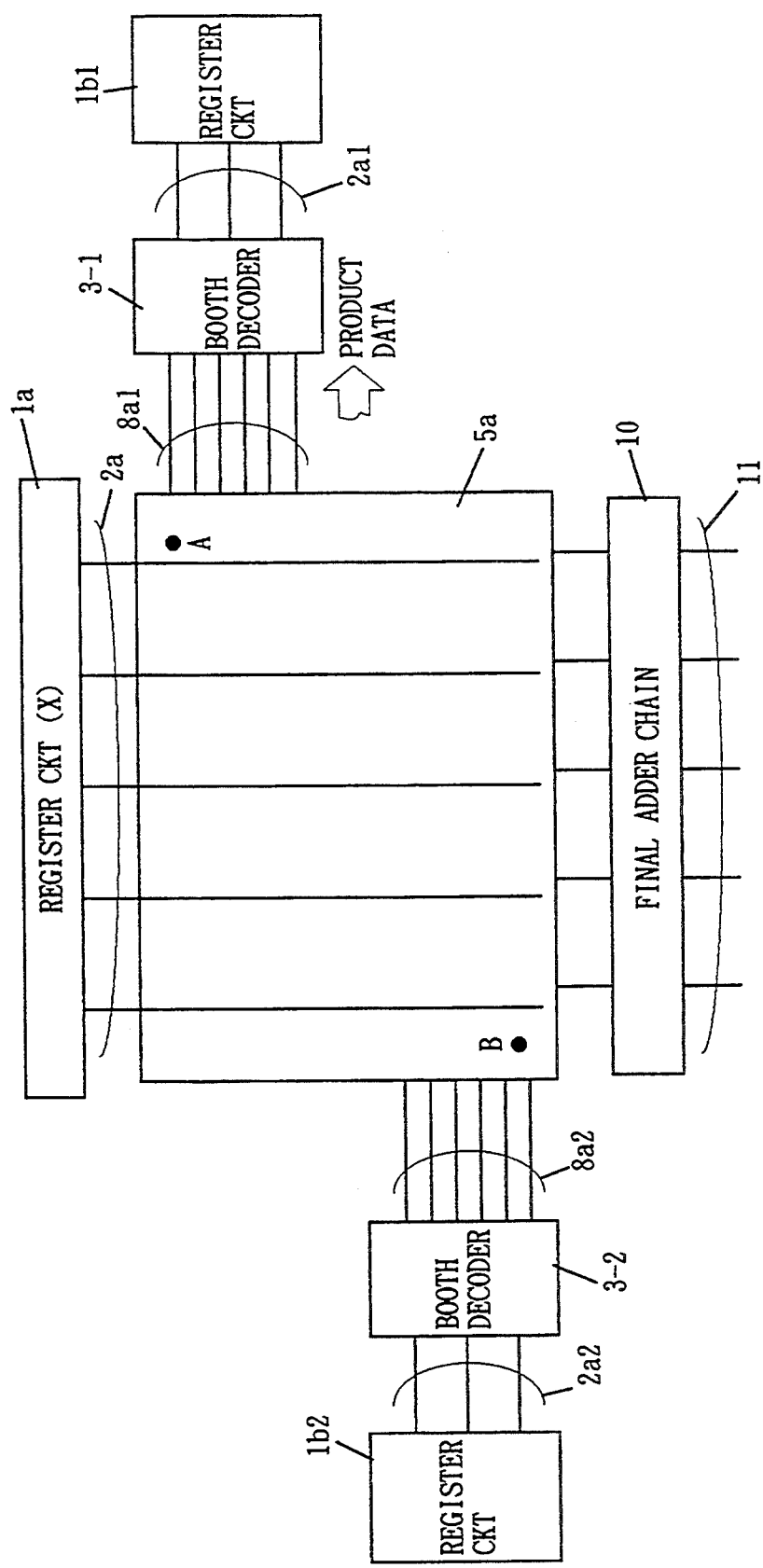
FIG. 14 is a diagram showing the structure of a multiplier according to a fourth embodiment of the invention.

FIG. 14 is a diagram showing the structure of a multiplier according to a fourth embodiment of the invention. In FIG. 14, the multiplier includes a first register circuit 1b1 for holding a prescribed number of less significant bits of a multiplier Y, a Booth decoder circuit 3-1 for receiving the data bits held at register circuit 1b1 through a data line 2a and performing a decoding operation based on the second order Booth algorithm, a register circuit 1b2 for holding the more significant bits of multiplier data Y, a Booth decode circuit 3-2 for receiving the data bits held at register circuit 1b2 through a data line 2a2 and performing a decoding operation based on the second order Booth algorithm. Register circuit 1b1 and Booth decode circuit 3-1 are arranged on the side of the less significant bits of the multiplicand data X, while register circuits 1b2 and Booth decoder circuit 3-2 are arranged on the side of the more significant bits of the multiplicand data X. In this case, as compared to the structure shown in FIG. 11, a region for leading out data from adder array 5a is secured (portions of Booth decoder circuit 3-2 and register circuit 1b2). Thus, product result data can readily be led out from adder array 5a.

In FIG. 14, in adder array 5a, a signal proceeds from the upper right to the lower left along the direction of diagonal line. As to an operation of the more significant bits, the output data of an operation in adder array 5a does not have to be decided in an early stage of processing. Accordingly, as illustrated in FIG. 14, even if register circuit 1b2 and decoder circuit 3-2 for the more significant bits of the multiplier data Y are provided on the side of the more significant bits of the multiplicand data X, the signal propagation delay does not affect the operation. Thus, utilizing the structure shown in FIG. 14, a multiplier sufficiently securing an area for leading out a product result from adder array 5a and still maintaining its high speed operability is provided.

EMBODIMENT 5

Figure 15:
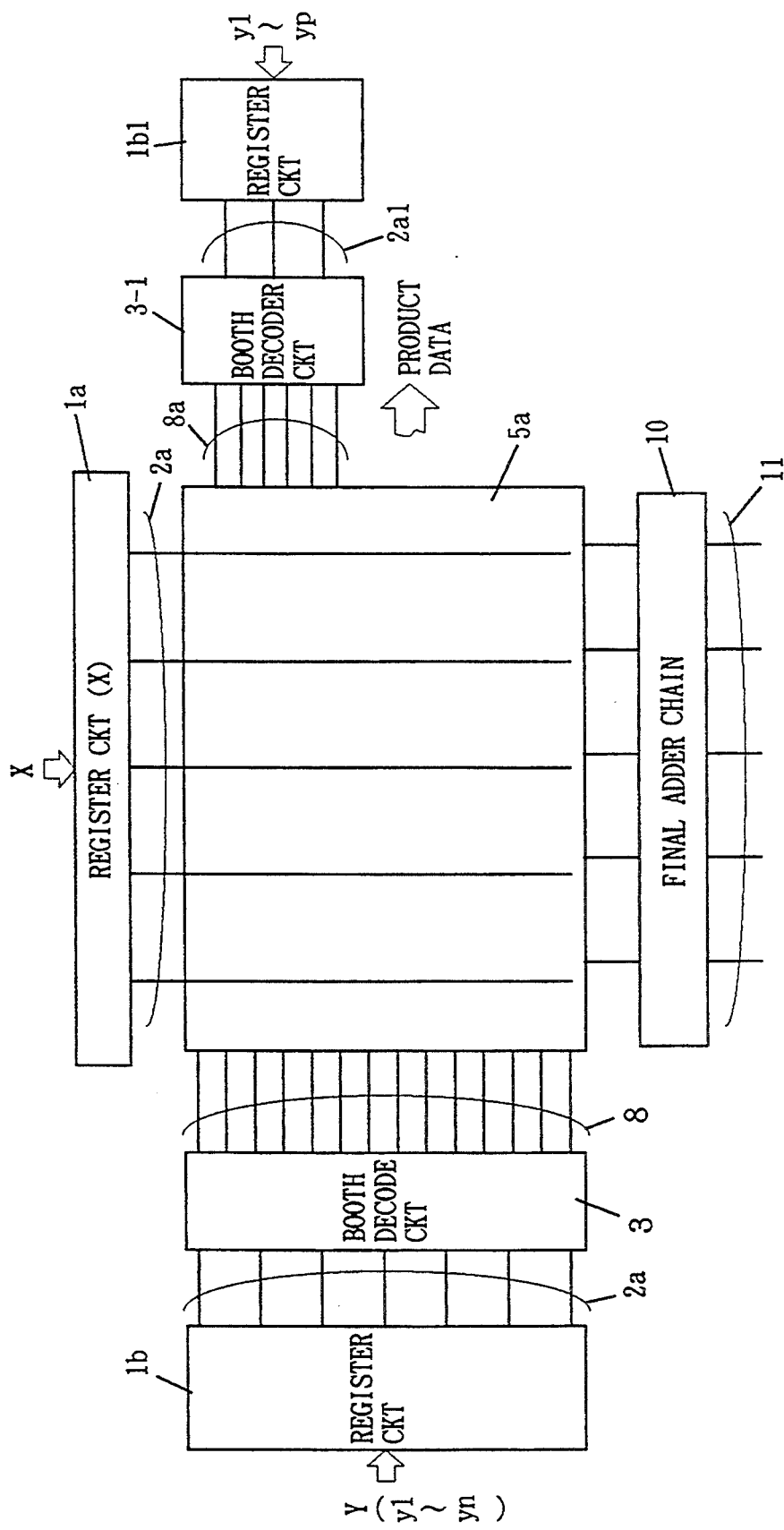
FIG. 15 is a diagram showing a fifth embodiment of the invention.

FIG. 15 is a diagram showing the structure of a multiplier according to a fifth embodiment of the invention. The multiplier shown in FIG. 15 includes a register circuit 1b1 provided on the right side of adder array 5a (on the side of the less significant bits of the multiplicand data X) for receiving a prescribed number of less significant bits y1-yp of the multiplier data Y, and a Booth decoder circuit 3-1 for performing a decoding operation to the data held at register circuit 1b1 according to the second order Booth algorithm. The output of Booth decoder circuits 3-1 is input to adder array 5a through a data line 8a. Register circuit 1b holds the multiplier data Y, Booth decode circuit 3 receives and decodes all the bits y1-yn of the multiplier data Y held at register circuit 1b, and inputs the results of the decoding to adder array 5a through data line 8a.

In the structure shown in FIG. 15, in adder array 5a, signal lines transmitting signals of the less significant bits of the decoding results are driven by decode circuits 3 and 3-1 on both sides. Thus, a signal on a data line to be determined by a signal attains a determined state at a high speed, thus enabling signals on the less significant bit side of the multiplicand data X to be determined at a high speed, thereby greatly reducing operation time necessary for multiplication.

In EMBODIMENTS 3–5, the structure of a multiplier utilizing the second Booth algorithm is presented. It may be a multiplier utilizing the third or higher order Booth algorithm, or a usual multiplier which does not use any Booth algorithm at all. Alternatively, the multiplier may be of a structure which utilizes both the second Booth algorithm and the third or higher Booth algorithm.

EMBODIMENT 6

In a conventional multiplier, an addition operation is performed in an adder array after a decoding operation by a Booth decoder is completed. Therefore, time required for multiplication is increased. Therefore, a structure by which time required for a decoding operation by the Booth decoder can apparently or virtually be eliminated will be described.

Figure 16:
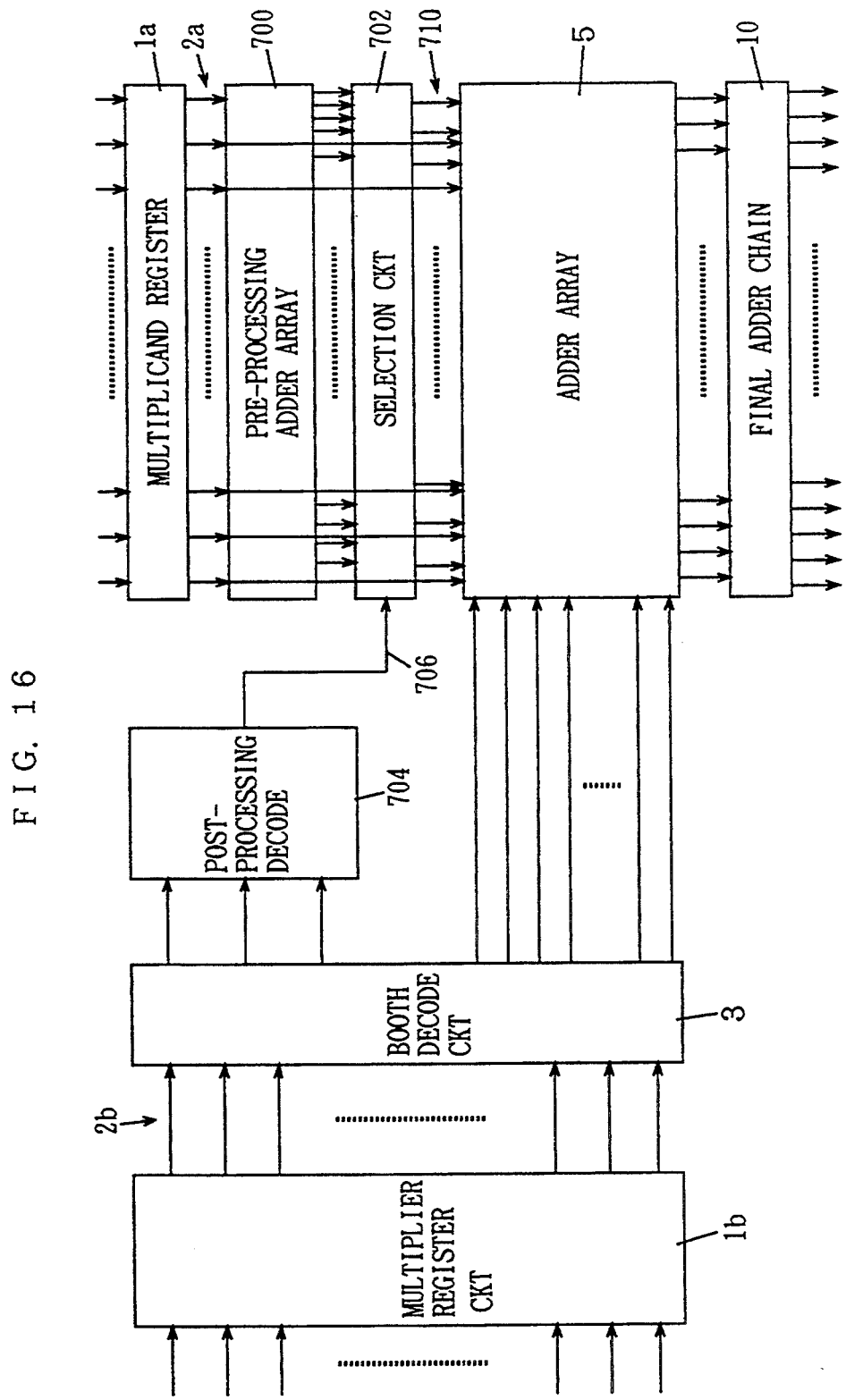
FIG. 16 is a diagram showing the structure of a multiplier according to a sixth embodiment of the invention.

FIG. 16 is a diagram showing the entire structure of a multiplier according to a sixth embodiment of the invention. In FIG. 16, the multiplier includes a multiplier register circuit 1b for holding a multiplier, a Booth decode circuit 3 for receiving the multiplier data from multiplier register circuit 1b through a data line 2b and performing a decoding operation according to a Booth algorithm, and a multiplicand register circuit 1a for holding a multiplicand X. Multiplier register circuit 1b, Booth decode circuit 3, and multiplicand register la have the same structures as illustrated in conjunction with the previous embodiments.

The multiplier further includes a pre-processing adder array 700 for receiving the multiplicand data X from multiplicand register circuit 1a through data line 2a and performing a pre-processing, a post-processing decode circuit 704 for receiving a decode result signal of a prescribed number of less significant bits of Booth decode circuit 3 and performing a post-processing, and a selection circuit 702 for receiving the decode result from post processing decode circuit 704 through a signal line 706 and selectively outputting a corresponding one of outputs from pre-processing adder array 700. Pre-processing adder array 700 receives the multiplicand data X from multiplicand register circuit 1a and produces all the partial products corresponding to the number of decode result signals applied to post-processing decode circuit 704. Pre-processing adder array 700 performs addition as to all the sums of possible partial products thus produced. Accordingly, in pre-processing adder array 700, addition is performed as to all the combinations of operations of the produced partial products.

Post-processing decode circuit 704 receives a prescribed number of decode result signals from Booth decode circuit 3 and produces on signal lines 706 a signal selecting a corresponding one of the results of addition produced by pre-processing adder array 700. Selection circuit 702 selects one of the addition results from pre-processing adder array 700 according to a decode result signal from post-processing decode circuit 704.

The multiplier further includes an adder array 5 for receiving the multiplicand data from multiplicand register 1a and produces a partial product according to the remaining decode result signals from Booth decode circuit 3, and producing an intermediate sum by adding the result of addition applied from selection circuit 702 and the produced partial products, and a final adder chain 10 for producing a multiplication result by adding up intermediate sums produced in adder array 5. The operation will be described.

Now, it is assumed that Booth decode circuit 3 performs a decoding operation according to the second order Booth algorithm. Pre-processing adder array 700 is considered to produce two partial products and add them. In pre-processing adder array 700, partial products are produced correspondingly to first and second partial products according to operations of $-2X$, $-X$, 0, X, and 2X. Accordingly, five kinds are each produced for the first and second partial products. Addition is executed as to operation of each of the five kinds. Therefore, there exist $5 \cdot 5 = 25$ kinds of addition results output from pre-processing adder array 700.

Decode results signals corresponding to the first and second partial products are applied from Booth decode circuit 3 to first post-processing decode circuit 704. Post-processing decode circuit 704 decodes operation instruction signals corresponding to the first and second partial products, and generates a signal designating one of the 25 kinds of addition results on signal line 706. Selection circuit 702 selectively applies one of the 25 kinds of addition results to adder array 5 through a signal line 710 in response to the signal on signal line 706.

The pre-processing operation in pre-processing adder array 700 is executed in parallel with the decoding operation in Booth decode circuit 3 and the decoding operation in post-processing decode circuit 704. Therefore, the time delay necessary for the decoding operation in Booth decode circuit 3 can apparently be eliminated, thus permitting execution of a high speed multiplication.

Figure 17:
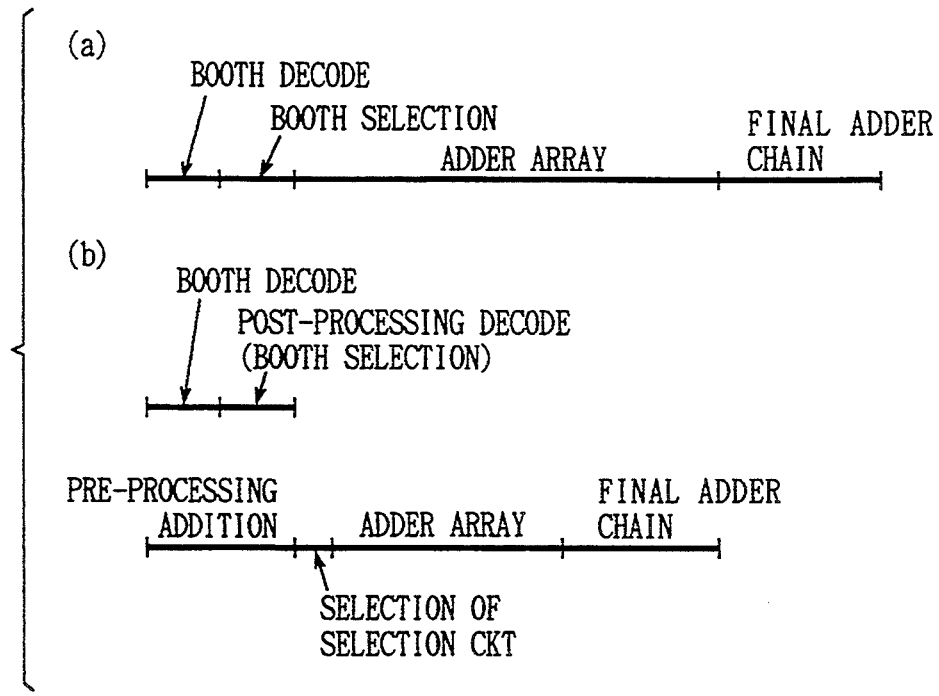
FIG. 17 is a representation showing the advantageous effect of the sixth embodiment.

FIG. 17 is a representation showing in comparison time required for multiplication operations by a conventional multiplier and the multiplier according to the embodiment. FIG. 17 at (a) shows time for a multiplication by the conventional multiplier, while FIG. 17 at (b) shows time for a multiplication by the multiplier according to the embodiment. In the conventional multiplier, an operation according to the result of the decoding is selected, then an addition is executed in adder array 5, and then an addition is performed in the final adder chain, thereby outputting a result of multiplication. Meanwhile, as illustrated in FIG. 17 at (b) according to the embodiment, in pre-processing adder array 700, a production of a prescribed number of partial products and the addition thereof are executed in parallel with the Booth decoding operation. After the Booth decoding operation, a decoding operation by post-processing decode circuit 704 is executed. At that time in adder array 5, a Booth selection operation according to the result of decoding from Booth decoding circuit 3 is executed. This Booth decoding operation and post processing decoding operation are considered to consume about the same time period necessary for the processing in pre-processing adder array 700. After the post-processing decoding operation, a selection by selection circuit 702 is executed. Then, addition is performed in adder array 5, and a multiplication result by the final addition is produced in the final adder chain. Therefore, time required for the Booth decoding operation can be reduced compared to the conventional multiplier shown in FIG. 17 at (a), thus permitting a high speed multiplication. FIG. 17 at (b) takes into consideration time delay in the selection operation by selection circuit 702. Selection circuit 702 can be formed of a multiplex circuit, whose time delay is within the amount of about one stage of a gate and can be made smaller than the time delay of one stage of a full adder. Selection of an operation according to the Booth algorithm in the adder array is executed in parallel with the post-processing decoding operation in post processing decode circuit 704. Accordingly, the time delay due to the Booth decoding operation and the Booth selection operation can be reduced as compared to the conventional multiplier, thus permitting a high speed multiplication operation.

In order to minimize the number of addition results to be produced in preprocessing adder array 700, it is only necessary to execute an addition processing in pre-processing adder array 700 which generates a delay equal to time necessary for the processing operations of Booth decode circuit 3 and post-processing decode circuit 704. Now, the specific structure of the pre-processing adder array will be described.

Figure 18:
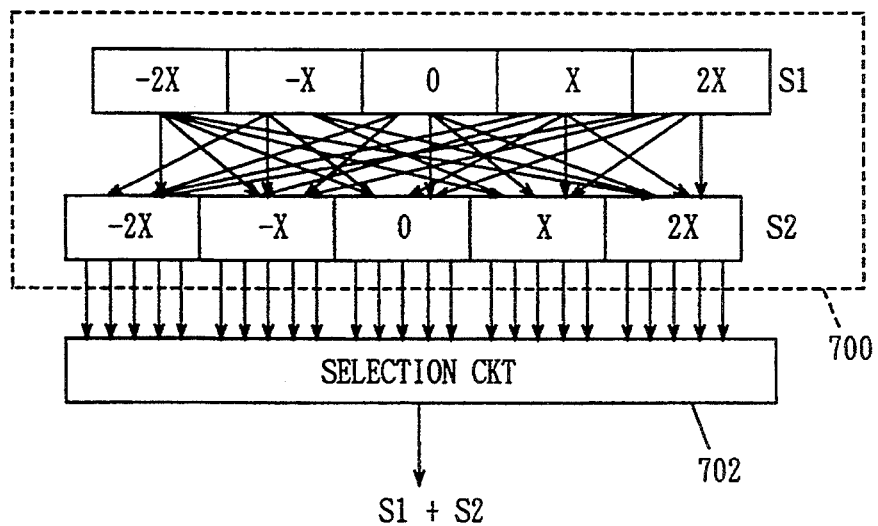
FIG. 18 is a representation showing the functional structure of a preprocessing adder array.

FIG. 18 is a representation showing the functional structure of the pre-processing adder array. In FIG. 18, a first partial product S1 and a second partial product S2 are produced, and the addition of the first and second partial products S1 and S2 is executed. The first partial product S1 includes partial products produced as to operations −2X, −X, 0, X and 2X, based on the second order Booth algorithm. The second partial product S2 similarly produces the partial products of −2X, −X, −, X, and 2X based on the second order Booth algorithm. Each partial products of the first partial product S1 and each partial product of the second partial product S2 are added. Accordingly, 25 kinds of addition results are produced from pre-processing adder array 700. Selection circuit 702 selects one addition result (S1+S2) from these 25 kinds of addition results.

Figure 19:
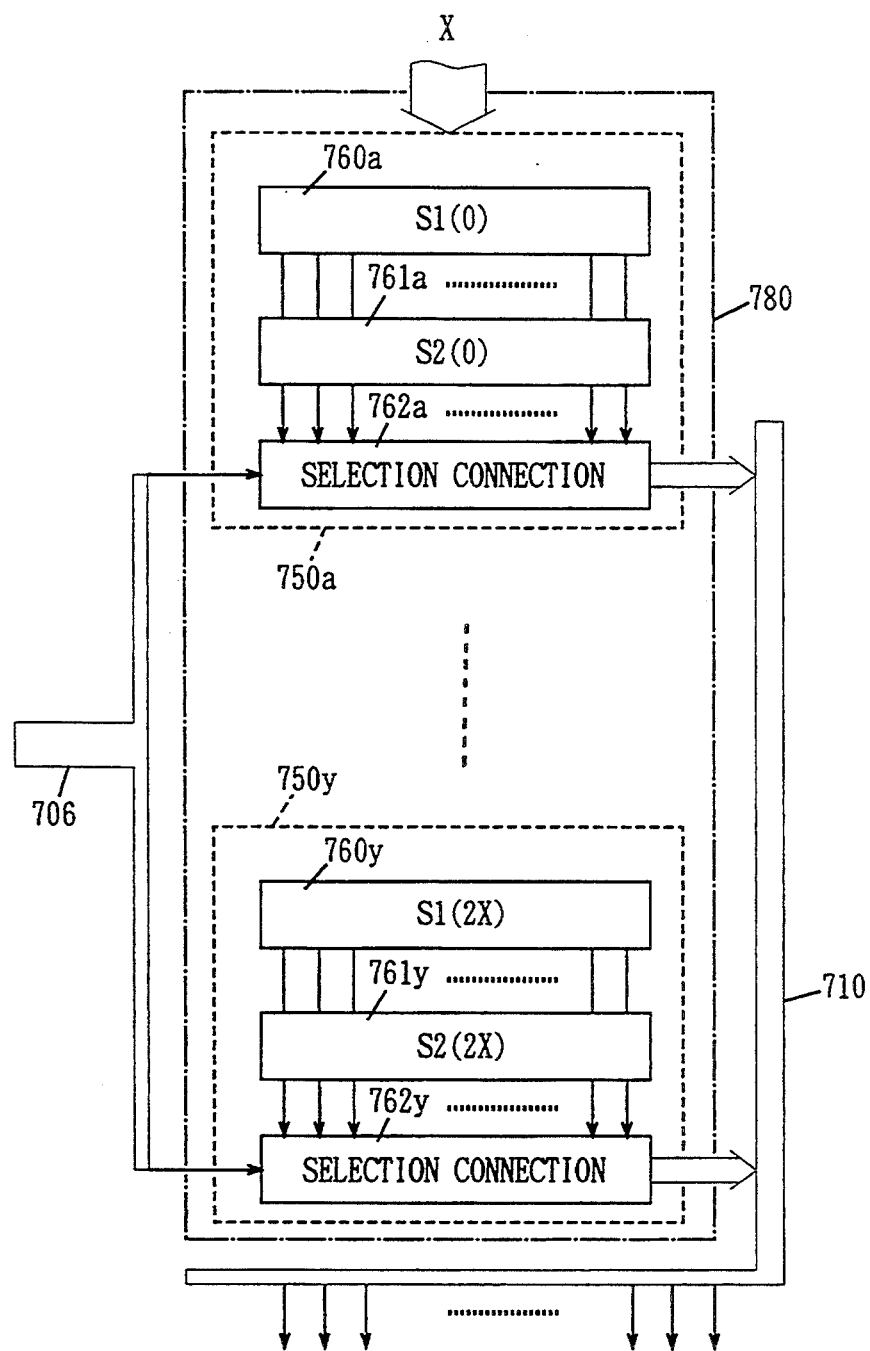
FIG. 19 is a diagram showing the positional relation between the preprocessing adder array and a selection circuit shown in FIG. 16.

FIG. 19 is a representation showing the specific placement of the pre-processing adder array and the selection circuit. In FIG. 19, a block 780 includes the pre-processing adder array and the selection circuit. Block 780 includes 25 addition result producing circuits 750a-750y. These 25 addition result producing circuits 750a-750y (only two of them are shown in FIG. 19 for the ease of representation) each includes a first partial product producing circuit 760a, second partial product producing circuits 761a-762y for producing the second partial product S2 and adding the first partial product S1 and the second partial product S2, selection connection circuits 762a-762y for transmitting a corresponding addition result onto signal line 710 in response to a control signal on signal line 706. Signal line 706 is a bus formed of 25 control signal lines. In each of addition result producing circuits 750a-750y, production and addition of partial products according to a combination of the second order Booth algorithm. In FIG. 19, the first partial product S1 (0) and the second partial product S2 (0) by operation 0 are produced in addition result producing circuit 750a, and the sum of them S1 (0)+S2 (0) is produced. Addition result producing circuit 750y performs operation 2X and produces first and second partial products S1 (2X) and S2 (2X), and produces an addition result S1 (2X)+S2 (2X) by adding them. A signal applied onto signal line 706 from post-processing decode circuit 704 turns on one of selection connection circuits 762a-762y. Thus, one addition result of the addition results from 25 addition result producing circuits 750a-750y is transmitted onto output signal line 710.

Figure 20:
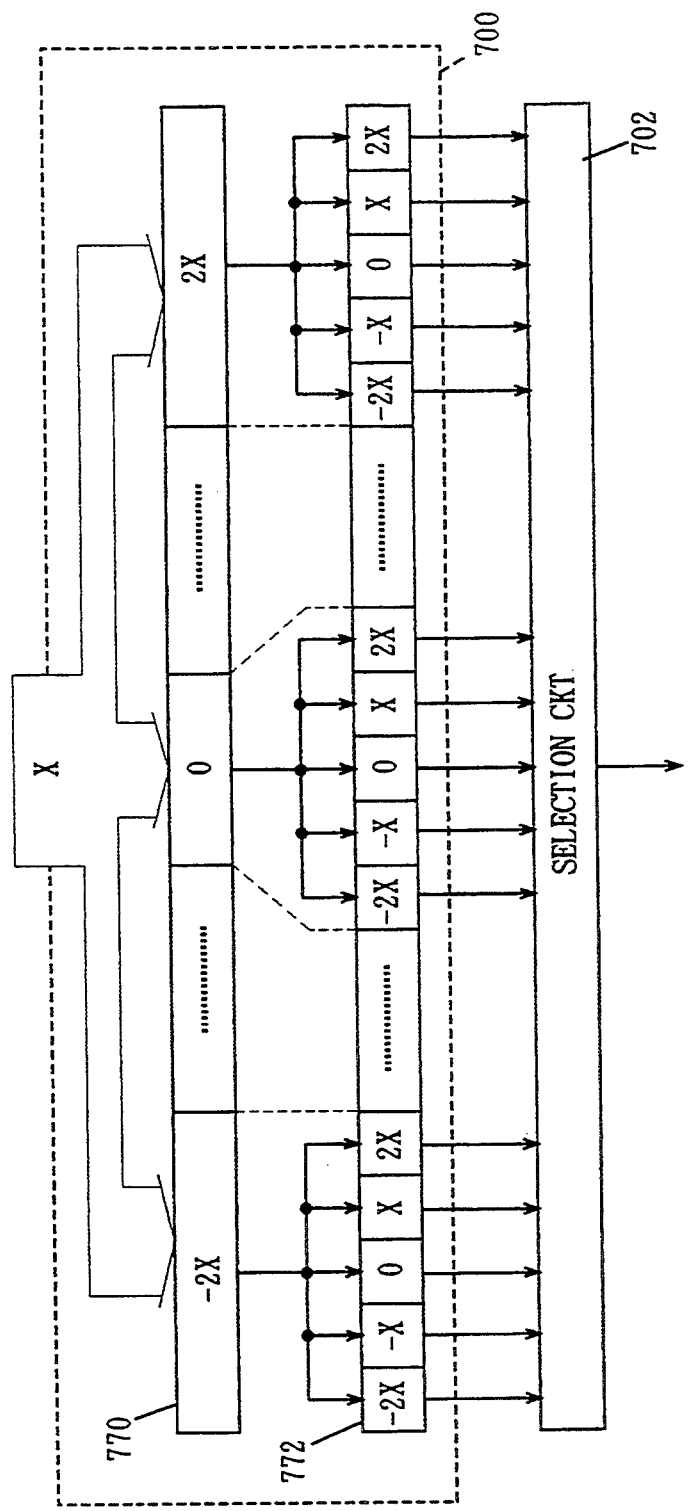
FIG. 20 is a diagram showing another structure of the pre-processing adder array shown in FIG. 16.

FIG. 20 is a diagram showing another structure for the pre-processing adder array. In FIG. 20, pre-processing adder array 770 includes a partial product producing circuit 770 for producing first partial products each for operations 2X through −2X, and a second partial product producing circuit 772 for producing second partial products each for operations 2X through −2X. Second partial product producing circuit 772 is arranged to perform five possible operations relative to one operation of first partial product producing circuit 770. Second partial product producing circuit 772 includes an adder for performing addition of a corresponding first partial product and each produced second partial product. More specifically, in the arrangement shown in FIG. 20, second partial product producing circuit 772 is arranged to execute 5 kinds of operations per one operation of first partial product producing circuit 770, and to produce addition results performing addition thereof in parallel. First partial product producing circuit 770 and second partial product producing circuit 772 may be arranged as shown in FIG. 20 with respect to each bit of the multiplicand data X, not for each operation of the entire multiplicand data X. Selection circuit 702 selects one of 25 kinds of addition results from pre-processing adder array 700.

In the above-described embodiments, the structures for producing two partial products according to the second Booth algorithm and adding them are illustrated. However, three partial products may be produced in the pre-processing adder array. When three partial products are produced, the number of addition result is 5·5·5=125. Selection circuit 702 selects one of these 125 addition results. The Booth algorithm to be used may be the third order or higher Booth algorithm.

The embodiments according to the invention have been described, and the essential effects brought about by the invention are as follows.

(1) Since the less significant bits of the multiplicand data are multiplied utilizing the second order Booth algorithm and the more significant bits are multiplied utilizing the third or higher order Booth algorithm, time necessary for producing an odd number multiply of the multiplicand data necessary for implementing a high order Booth algorithm can apparently or virtually be eliminated, thereby providing a multiplier capable of executing a high speed multiplication.

(2) Since the bit number of the less significant bits of the multiplier to which the second order Booth algorithm is applied is set equal to time (the number of stages of addition circuits) necessary for producing tripled data required in the third order Booth algorithm, the production of the tripled number and multiplication operation according to the second order Booth algorithm can completely be executed in parallel, and therefore time necessary for producing the tripled number can apparently be eliminated, thereby providing a multiplier capable of a high speed multiplication operation.

(3) Since a fixed number multiples of the multiplicand necessary for the Booth algorithm are produced before the multiplicand data is input into the adder array, time necessary for producing the fixed number multiples can be saved, thereby providing a multiplier capable of executing a high speed multiplication operation.

(4) Since each of the multiplier data and the multiplicand data is input into the adder array from the other's less significant bit side, a signal necessary for multiplication of the less significant bits can be determined at a high speed, and therefore a multiplier capable of executing a high speed multiplication free from the influence of signal propagation delay due to the loads of signal lines can be provided.

(5) Among the outputs of the Booth decoder circuit, decoding information for the less significant bits is input from the side of the less significant bits of multiplicand data, a multiplier capable of executing a high speed multiplication free from the influence of signal propagation delay in a line for transmitting a result of decoding can be provided.

(6) Since the decoder circuit for performing a decoding operation according to the Booth algorithm is provided on the side of the less significant bits of the multiplicand data, a multiplier capable of executing a high speed operation free from the influence of signal propagation delay in a signal line for transmitting a result of decoding can be provided.

(7) Since the decode circuit for performing a decoding operation according to the Booth algorithm is provided on both of the more significant bit side and less significant bit side of the multiplicand data, a multiplier capable of executing a high speed multiplication free from the influence of signal propagation delay in a signal line for transmitting a result of decoding can be provided.

(8) Since the decoder circuit for decoding the more significant bits of the multiplier data is provided on the side of the less significant bits of the multiplicand data and the decoder circuit for decoding the more significant bits of the multiplier data is provided on the side of the more significant bits of the multiplicand data, the area of a signal line for a result of multiplication from adder array can be secured.

(9) Since the Booth decoder circuit for decoding only the less significant bits of the multiplier data is provided on the side of the less significant bits of the multiplicand data and the Booth decoder circuit for decoding all the bits of the multiplier data is provided on the side of the more significant bits of the multiplicand data, a signal line for transmitting a result of decoding of the less significant bits of the multiplier data can be driven from both sides, and therefore a multiplier capable of executing a high speed multiplication free from the influence of signal propagation delay due to the load of the signal line can be provided. In addition, a sufficient area for a signal line for leading out a result of multiplication from the adder array can also be secured.

(10) Since adding operation is executed in the adder array during the decoding operation of the Booth decode circuit and an output of the adder array is selected according to the output of the Booth decode circuit, time necessary for the Booth decoding operation can be eliminated, and therefore a multiplier capable of executing a high speed multiplication can be provided.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A multiplier for executing multiplication of a multiplier Y and a multiplicand X both formed of a plurality of bits according to a Booth algorithm, comprising:

first decode means for decoding a prescribed number of less significant bits of said multiplier Y according to a second order Booth algorithm and for producing a first decode output;

second decode means for decoding remaining more significant bits of said multiplier Y which do not overlap with said prescribed number of less significant bits according to a greater than second order Booth algorithm and for producing a second decode output;

means for producing a first partial product from the first decode output received from said first decode means and said multiplicand X;

means for producing a second partial product from the second decode output received from said second decode means and said multiplicand X; and means for producing a multiplication result of said multiplier Y and said multiplicand X using said first partial product and said second partial product.

2. A multiplier for executing multiplication of a multiplier Y and a multiplicand X both formed of a plurality of bits according to a Booth algorithm, comprising:

first decode means for decoding a prescribed number of less significant bits of said multiplier Y according to a second order Booth algorithm;

second decode means for decoding the remaining more significant bits of said multiplier Y according to a third order Booth algorithm which do not overlap with said prescribed number of less significant bits;

first partial product producing means for producing a first partial product from the output of said first decode means and said multiplicand X;

second partial product producing means for producing a second partial product from the output of said second decode means and said multiplicand X, said second partial product producing means including triple producing means for producing a triple value of said multiplicand X by adding said multiplicand X with a double value of said multiplicand X; and means for producing a multiplication result of said multiplier Y and said multiplicand X using said first partial product and said second partial product, said prescribed number of less significant bits being determined according to a first time for said triple producing means to produce the triple value of said multiplicand X by adding said multiplicand X with the double value of said multiplicand X.

3. A multiplier according to claim 2, wherein said prescribed number of less significant bits is determined such that a second time required for producing said first partial product encompasses the first time for production of said triple value of said multiplicand X.

4. A multiplier for executing multiplication of a multiplier Y and multiplicand X according to a Booth algorithm, comprising:

fixed number multiple producing means for producing first data of a fixed number multiple of said multiplicand X necessary for the Booth algorithm from said multiplicand X;

input means for receiving second data of said multiplicand X and outputting the second data of said multiplicand X after the fixed number multiple is output from said fixed number multiple producing means;

decode means for decoding less significant bits of said multiplier Y according to the Booth algorithm, and for decoding more significant bits of said multiplier Y which do not overlap with said less significant bits, and producing a decode output responsive thereto;

selector means for producing third data of a partial product from the second data of the multiplicand X received from said input means and the first data of said fixed number multiple producing means according to the decode output of said decode means; and product producing means for producing a product of said multiplier Y and said multiplicand X by adding up the third data received from said selector means.

5. A multiplier for executing multiplication of a multiplier Y of a plurality of bits and a multiplicand X of a plurality of bits, comprising:

partial product producing means for producing partial products from said multiplier Y and said multiplicand X;

product producing means including an adder array for receiving and adding up the partial products received from said partial product producing means and producing a product X·Y of said multiplier Y and said multiplicand X;

multiplier input means for receiving said multiplier Y and applying said multiplier Y to said partial product producing means, said multiplier Y having first less and first more significant bits, and said multiplier input means having first positions corresponding to the first less significant bits and second positions corresponding to the first more significant bits; and multiplicand input means for receiving said multiplicand X and applying the multiplicand X to said partial product producing means, said multiplicand X having second less and second more significant bits, and said multiplicand input means having third positions corresponding to the second less significant bits and fourth positions corresponding to the second more significant bits, and wherein said first positions and said third positions are positioned closer to each other than said second and fourth positions of said multiplicand and multiplier input means, and wherein said first and second less significant bits do not overlap with each other.

6. A multiplier as recited in claim 5, wherein said partial product producing means includes, decode means for decoding said multiplier Y according to a Booth algorithm and producing a decode output, fixed number multiple producing means for producing a fixed number multiple of said multiplicand X necessary for said Booth algorithm from said multiplicand X, and partial product producing means responsive to the decode output of said decode means for selecting one of the fixed number multiple received from said fixed number multiple producing means and said multiplicand X and producing a partial product therefrom.

7. A multiplier for executing multiplication of a multiplier Y of a plurality of bits and a multiplicand X of a plurality of bits according to a Booth algorithm, comprising:

a multiplicand transmitting line for transmitting data of said multiplicand X in a parallel and having a side transmitting less significant bits of said multiplicand X;

decode means provided on the side of the less significant bits of said multiplicand transmitting line for decoding less significant bits of said multiplier Y according to the Booth algorithm, and for decoding more significant bits of said multiplier Y which do not overlap with said less significant bits, and producing a decode output responsive thereto;

partial product producing means for producing partial products from the decode output of said decode means and said multiplicand X according to said Booth algorithm; and product producing means for producing the product X·Y of said multiplier Y and said multiplicand X by adding up the partial products received from said partial product producing means.

8. A multiplier for executing multiplication of a multiplier Y of a plurality of first bits and a multiplicand X of a plurality of second bits according to a Booth algorithm, comprising:

a multiplicand transmitting line for transmitting the second bits of said multiplicand X in parallel and having first and second sides for respectively transmitting less and more significant bits of said multiplicand X;

first decode means provided on the first side of the less significant bits of said multiplicand transmitting line for decoding prescribed bits of the first bits of said multiplier Y according to the Booth algorithm and producing a first decode output;

second decode means provided on the second side of the more significant bits of said multiplicand transmitting line for decoding remaining bits of said multiplier Y which do not overlap with said prescribed bits of said multiplier Y according to said Booth algorithm and producing a second decode output;

partial product producing means for producing partial products according to the Booth algorithm from the first and second decode outputs of said first and second decode means and said multiplicand X; and product means for producing a product X·Y of said multiplier Y and said multiplicand X by adding up the partial products received from said partial product producing means.

9. A multiplier as recited in claim 8, wherein
said first decode means decodes a prescribed number of less significant bits of said multiplier Y according to said Booth algorithm, and
said second decode means decodes the remaining more significant bits of said multiplier Y according to said Booth algorithm.

10. A multiplier as recited in claim 8, wherein
said first decode means decodes only the prescribed number of less significant bits of said multiplier Y according to said Booth algorithm and said second decode means decodes the remaining more significant bits of the multiplier.

11. A multiplier as recited in claim 8, further comprising data output nodes for providing data bits of said result of the multiplication and provided on the side of less significant bits of said multiplicand transmitting line.

12. A multiplier as recited in claim 8, wherein said partial product producing means includes an array of adders arranged such that a carry output of an adder is supplied to an input of an adder of one bit higher digit in a subsequent stage, and said multiplier further includes a data output line for leading out data bits of the result of multiplication extending from said array at a side of a less significant bit of said multiplicand.

13. A multiplier for executing multiplication of a multiplier Y processed by a Booth algorithm to generate prescribed bits, and a multiplicand X processed by an adder array to generate partial products, comprising:

decode means for decoding first bits of said multiplier Y according to said Booth algorithm, and for decoding second bits of said multiplier Y which do not overlap with said first bits, and producing a decode result responsive thereto;

means for selecting one of the partial products of said multiplicand X and the prescribed bits of the multiplier Y responsive to said decode result; and multiplication means for generating the multiplication of the multiplicand X and the multiplier Y responsive to the partial products and the prescribed bits received from said decode means.

14. A method of multiplying a multibit binary multiplier Y and a multibit binary multiplicand X, comprising the steps of:

decoding a predetermined number of bits of said multiplier Y according to a second order Booth algorithm and remaining bits of said multiplier Y according to a third order Booth algorithm where the predetermined number of bits and the remaining bits do not overlap;

in parallel with said decoding step, producing a triple of said multiplicand X;

in parallel with said producing a triple stem, selecting a first operation to be executed in response to the decoding of said predetermined number of bits, and producing a first partial product according to the first operation to be executed and said multiplicand X;

after production of said triple step, selecting a second operation to be executed according to the decoding of said remaining bits, and producing a second partial product according the selected second operation and the multiplicand X; and adding up said first and second partial products to produce data of multiplication of said multiplier Y and said multiplicand X.

15. A method of multiplying a multibit binary multiplier Y and a multibit binary multiplicand X having less significant bits using an electronically implemented multiplier device including an adder array having first and second sides and a plurality of adders arranged in an array, comprising the steps of:

supplying said multibit binary multiplicand X in parallel into said adder array;

decoding a predetermined number of less significant bits of said multibit binary multiplier Y according to a first Booth algorithm and supplying a first decoded signal indicating a first operation to be executed obtained through the decoding into said adder array at the first side near a portion through which said adder array receives the less significant bits of said multibit binary multiplicand X;

decoding remaining bits of said multibit binary multiplier Y which do not overlap with said predetermined number of less significant bits according to a second Booth algorithm and supplying a second decoded signal indicating a second operation to be executed obtained through the decoding into the adder array at the second side opposite to said first side;

obtaining a result of multiplication of said multibit binary multiplier Y and said multibit binary multiplicand X responsive to said first and second decoded signals using said adder array.

16. A method as recited in claim 15, further comprising the step of decoding the predetermined number of less significant bits of said multibit binary multiplier and supplying a third decoded signal into said adder array at the second side, said first and third decoded signals produced in parallel.

17. A method as recited in claim 15, further comprising the step of leading out a part of the result of multiplication at said first side of said adder array to produce an external data bit.

18. A method of multiplying a multibit binary multiplicand X and multibit binary multiplier Y, comprising the steps of:

producing all possible partial products in a calculation according to a Booth algorithm with respect to a predetermined number of bits of said multibit binary multiplier Y and said multibit binary multiplicand X;

according to the producing of said all possible partial products, producing possible intermediate sums for respective possible partial products through addition of related partial products;

in parallel with the producing of all possible partial products and intermediate sums, decoding the predetermined number of less significant bits according to the Booth algorithm to generate a selection signal;

in parallel with the decoding of the predetermined number of less significant bits, decoding remaining bits of said multibit binary multiplier Y which do not overlap with said predetermined number of less significant bits to produce a decode signal indicating an operation to be executed according to the Booth algorithm;

in response to the selection signal, selecting an intermediate sum from said possible intermediate sums;

according to the selected intermediate sum, the decode signal and the multibit binary multiplicand X, producing a final product indicating the multiplication of said multibit binary multiplier X and multiplicand X through generation of a partial product corresponding to the decode signal and the multiplicand X, and addition of the intermediate sum and the partial product.

* * * * *